(12) United States Patent
Liu et al.

(10) Patent No.: US 11,075,677 B2
(45) Date of Patent: Jul. 27, 2021

(54) METHOD AND DEVICE FOR SENDING BEAM REFINEMENT PROTOCOL PACKET

(71) Applicant: HUAWEI TECHNOLOGIES CO., LTD., Guangdong (CN)

(72) Inventors: Jinnan Liu, Beijing (CN); Dejian Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/804,713

(22) Filed: Feb. 28, 2020

(65) Prior Publication Data

US 2020/0204235 A1    Jun. 25, 2020

Related U.S. Application Data

(63) Continuation of application No. PCT/CN2018/084856, filed on Apr. 27, 2018.

(30) Foreign Application Priority Data

Aug. 31, 2017    (CN) .......................... 201710776247.6

(51) Int. Cl.
*H04B 7/06* (2006.01)
*H04W 72/04* (2009.01)

(52) U.S. Cl.
CPC ......... *H04B 7/0617* (2013.01); *H04B 7/0695* (2013.01); *H04W 72/046* (2013.01)

(58) Field of Classification Search
CPC .......... H04B 7/04; H04B 7/06; H04B 7/0417; H04B 7/0617; H04B 7/0619;
(Continued)

(56) References Cited

U.S. PATENT DOCUMENTS 10,904,062 B2 *    1/2021   Lomayev ............ H04L 27/2613
2013/0089000 A1    4/2013   Hansen et al.
(Continued)

FOREIGN PATENT DOCUMENTS

CN    103052085 A    4/2013
CN    103718591 A    4/2014
(Continued)

OTHER PUBLICATIONS

P802.11 ay(TM)/D0.5, Draft Standard for Information Technology—Telecommunications and Information Exchange Between Systems—Local and Metropolitan Area Networks—Specific Requirements—Part 11 : Wireless LAN Medium Access Control (MAC) and Physical Layer (PHY) Specifications—Amendment 7: Enhanced t, IEEE P802.11AY/D0.5, XP068137603, Aug. 2017, 249 pages.
(Continued)

*Primary Examiner* — Shawkat M Ali
(74) *Attorney, Agent, or Firm* — Fish & Richardson P.C.

(57) ABSTRACT

Example methods and devices for sending a beam refinement protocol packet are provided in this application, which support a transmission format of multi-channel transmission and multi-antenna transmission. One example method for sending a beam refinement protocol packet includes determining a transmission format of a beam training (TRN) subfield by a first device based on first information. The first information includes information indicating a quantity of transmit chains used for transmitting the TRN subfield on each channel and information indicating a channel aggregation mode. The first device sends a beam refinement protocol packet to a second device on a transmit chain based on the transmission format, where the beam refinement protocol packet includes a data field and a TRN field, and the TRN field includes a plurality of TRN subfields.

14 Claims, 6 Drawing Sheets

(58) Field of Classification Search
CPC ......... H04B 7/0695; H04B 7/26; H04J 13/00; H04L 5/00; H04L 25/02; H04L 27/26; H04L 29/06; H04W 4/00; H04W 16/28; H04W 72/04; H04W 72/08; H04W 72/046; H04W 84/12
USPC ........ 370/254, 329; 375/219, 260, 367, 295, 375/316
See application file for complete search history.

(56) References Cited

U.S. PATENT DOCUMENTS

| | | |
|---|---|---|
| 2016/0119043 A1* | 4/2016 | Rajagopal .............. H04B 7/086 370/329 |
| 2016/0190686 A1 | 6/2016 | Gao et al. |
| 2016/0323755 A1 | 11/2016 | Cordeiro et al. |
| 2016/0329938 A1 | 11/2016 | Jo et al. |
| 2017/0079031 A1 | 3/2017 | Maltsev, Jr. et al. |
| 2017/0085306 A1 | 3/2017 | Cariou et al. |
| 2019/0074873 A1 | 3/2019 | Liu et al. |
| 2019/0158321 A1 | 5/2019 | Liu et al. |
| 2019/0215702 A1* | 7/2019 | Yun .......................... H04L 27/26 |
| 2019/0268055 A1 | 8/2019 | Li et al. |

FOREIGN PATENT DOCUMENTS

| | | |
|---|---|---|
| CN | 108023627 A | 5/2018 |
| WO | 2016175949 A2 | 11/2016 |
| WO | 2017190354 A1 | 11/2017 |
| WO | 2017190359 A1 | 11/2017 |

OTHER PUBLICATIONS

Extended European Search Report issued in European Application No. 18850157.1 dated Jun. 2, 2020, 9 pages.

IEEE Std 802.11ad™-2012 Part 11: Wireless LAN Medium Access Control (MAC) and Physical Layer (PHY) Specifications Amendment 3: Enhancements for Very High Throughput in the 60 GHz Band, IEEE Computer Society, Dec. 28, 2012, 628 pages.

IEEE P802.11ay/D0.35, Draft Standard for Information Technology—Telecommunications and Information Exchange Between Systems—Local and Metropolitan Area Networks—Specific Requirements—Part 11: Wireless LAN Medium Access Control (MAC) and Physical Layer(PHY) Specifications—Amendment 7: Enhanced throughput for operation in license-exempt bands above 45 GHz, May 2017, 256 pages.

Office Action issued in Chinese Application No. 201710776247.6 dated Apr. 1, 2020, 6 pages.

PCT International Search Report and Written Opinion in International Application PCT/CN2018/084,856, dated Aug. 1, 2018, 17 pages (With English Translation).

* cited by examiner

METHOD AND DEVICE FOR SENDING BEAM REFINEMENT PROTOCOL PACKET

CROSS-REFERENCE TO RELATED APPLICATION

This application is a continuation of International Application No. PCT/CN2018/084856, filed on Apr. 27, 2018, which claims priority to Chinese Patent Application No. 201710776247.6, filed on Aug. 31, 2017. The disclosures of the aforementioned applications are hereby incorporated by reference in their entireties.

TECHNICAL FIELD

This application relates to the field of communications technologies, and in particular, to a method and a device for sending a beam refinement protocol packet.

BACKGROUND

In a network including an access point (AP) and a plurality of stations (STA), communication between the AP and the STA is allowed, and communication between the STAs is allowed.

The Institute of Electrical and Electronics Engineers (IEEE) 802.11ad works in a millimeter-wave band. Between the AP and the STA, and between the STAs, beam alignment between a receive end and a transmit end can be implemented by using a beam refinement protocol (BRP) packet. The BRP packet is a special packet formed by suffixing a training (TRN) field to a data field in a common physical layer data packet (physical layer protocol data unit, PPDU). The transmit end may adjust a beam direction of a transmit antenna by using some of TRN subfields included in the TRN field, or the receive end may adjust a beam direction of a receive antenna when receiving a TRN subfield in the TRN field. In addition, because the TRN subfield is a pre-defined sequence, the receive end may obtain an estimate of a channel state of the transmit end in a transmit/receive antenna beam configuration by measuring a received signal-to-noise ratio (SNR), a received signal strength, and the like of the TRN subfield.

Currently, the IEEE 802.11 lay that is being drafted introduces a multi-channel transmission and multi-antenna transmission technology based on the IEEE 802.11ad, to increase a system throughput. Therefore, the BRP packet needs to be correspondingly expanded to support a transmission format of multi-channel transmission and multi-antenna transmission, and the BRP packet supports a multi-channel transmission and multi-antenna transmission procedure, thereby improving beam training and beam tracking efficiency.

SUMMARY

Embodiments of this application provide a method and a device for sending a beam refinement protocol packet, so that a BRP packet supports a transmission format of multi-channel transmission and multi-antenna transmission, thereby improving beam training and beam tracking efficiency.

According to a first aspect, a method for sending a beam refinement protocol packet is provided. The method may be performed by a first device. The first device is, for example, an AP or a STA. The method includes: determining, by the first device, a transmission format of a TRN subfield based on first information, where the first information includes at least one of information indicating a quantity of transmit chains used for transmitting the TRN subfield on each channel, information indicating a type of an antenna used for transmitting the TRN subfield, and information indicating a channel transmission mode; and the channel transmission mode is a channel bonding mode or a channel aggregation mode, and the type of the antenna is a single polarization mode or a dual polarization mode; and sending, by the first device, a beam refinement protocol packet to a second device on a transmit chain based on the transmission format, where the beam refinement protocol packet includes a data field and a TRN field, and the TRN field includes a plurality of TRN subfields.

According to a second aspect, a method for receiving a beam refinement protocol packet is provided. The method may be performed by a second device. If a first device is an AP, the second device may be a STA; or if a first device is a STA, the second device may be another STA. The method includes: receiving, by the second device, notification signaling sent by the first device, where the notification signaling is used to indicate a transmission format of a TRN subfield in the beam refinement protocol packet sent by the first device; the transmission format is determined based on first information, and the first information includes at least one of information indicating a quantity of transmit chains used for transmitting the TRN subfield on each channel, information indicating a type of an antenna used for transmitting the TRN subfield, and information indicating a channel transmission mode; and the channel transmission mode is a channel bonding mode or a channel aggregation mode, and the type of the antenna is a single polarization mode or a dual polarization mode; and receiving, by the second device, the beam refinement protocol packet from a transmit chain of the first device based on the transmission format, where the beam refinement protocol packet includes a data field and a TRN field, and the TRN field includes a plurality of TRN subfields.

In this embodiment of this application, in a multi-channel transmission and multi-antenna transmission mode, the first device may determine the transmission format of the TRN subfield based on the first information, to be specific, the beam refinement protocol packet supports a transmission format of multi-channel transmission and multi-antenna transmission, so that the first device may send the beam refinement protocol packet to the second device by using the determined transmission format, thereby improving beam training and beam tracking efficiency.

In a possible design, when the channel transmission mode is the channel aggregation mode, a quantity of transmit chains used for transmitting the TRN subfield on a first channel is $\lceil A/2 \rceil$, and a quantity of transmit chains used for transmitting the TRN subfield on a second channel is $\lfloor A/2 \rfloor$, where $\lceil \ \rceil$ indicates rounding up, $\lfloor \ \rfloor$ indicates rounding down, A indicates a quantity of transmit chains used for transmitting the TRN subfield, A is an integer greater than 1 and less than or equal to 8, a bandwidth of the first channel is greater than or equal to a bandwidth of the second channel, and the first channel and the second channel are channels participating in channel aggregation.

In this embodiment of this application, quantities of transmit chains allocated to different channels participating in channel aggregation are different, thereby implementing more flexible transmission and fully using the channels. In addition, a relatively large quantity of transmit chains can be allocated to a channel having a relatively large bandwidth, to fully use bandwidth resources.

In a possible design, if a value of ⌈A/2⌉ or Bj is 1, the transmission format of the TRN subfield is sending a first TRN basic sub-sequence on a first transmit chain; or if a value of ⌈A/2⌉ or Bj is 2, the transmission format of the TRN subfield is sending the first TRN basic sub-sequence on the first transmit chain, and sending a second TRN basic sub-sequence on a second transmit chain; or if a value of ⌈A/2⌉ or Bj is 3, the transmission format of the TRN subfield is separately sending the first TRN basic sub-sequence on the first transmit chain in two time units, separately sending the second TRN basic sub-sequence on the second transmit chain in the two time units, and separately sending a third TRN basic sub-sequence on a third transmit chain in the two time units; and a mask used by the first TRN basic sub-sequence is [1, 1], a mask used by the second TRN basic sub-sequence is [1, 1], and a mask used by the third TRN basic sub-sequence is [1, −1]; or if a value of ⌈A/2⌉ or Bj is 4, the transmission format of the TRN subfield is separately sending the first TRN basic sub-sequence on the first transmit chain in the two time units, separately sending the second TRN basic sub-sequence on the second transmit chain in the two time units, separately sending the third TRN basic sub-sequence on the third transmit chain in the two time units, and separately sending a fourth TRN basic sub-sequence on a fourth transmit chain in the two time units; and a mask used by the first TRN basic sub-sequence is [1, 1], a mask used by the second TRN basic sub-sequence is [1, 1], a mask used by the third TRN basic sub-sequence is [1, −1], and a mask used by the fourth TRN basic sub-sequence is [1, −1], where Bj indicates a quantity of transmit chains used for transmitting the TRN subfield on a $j^{th}$ channel participating in the channel aggregation, where j=1 or 2.

It can be learned that in this embodiment of this application, if the channel transmission mode is the CA mode, the TRN subfield to be transmitted on each transmit chain is equivalent to that when the channel transmission mode is the CB mode. This is equivalent to shortening a length of the TRN subfield in the CA mode, thereby improving beam training efficiency in the CA mode.

In a possible design, a total length of a first sub-beam refinement protocol packet transmitted through the first channel is the same as a total length of a second sub-beam refinement protocol packet transmitted through the second channel, and the beam refinement protocol packet includes the first sub-beam refinement protocol packet and the second sub-beam refinement protocol packet.

For a CA scenario, in this application, different antennas connected to different radio frequency chains are allocated to different channels, and quantities of sectors that need to be trained on the antennas are different. Consequently, lengths of TRN fields transmitted through two channels are different, and a case in which BRP packets transmitted through different channels cannot be aligned may be caused. Therefore, in this embodiment of this application, to align lengths of BRP packets transmitted through the two aggregated channels, total lengths of the BRP packets transmitted through the two channels participating in the CA may be equalized, thereby achieving better sending and receiving performance.

In a possible design, if a value of A is 2, the transmission format of the TRN subfield is sending a first TRN basic sub-sequence on a first transmit chain, and sending a second TRN basic sub-sequence on a second transmit chain; or if a value of A is 3, the transmission format of the TRN subfield is sending the first TRN basic sub-sequence on the first transmit chain, sending the second TRN basic sub-sequence on the second transmit chain, and sending a third TRN basic sub-sequence on a third transmit chain; or if a value of A is 4, the transmission format of the TRN subfield is sending the first TRN basic sub-sequence on the first transmit chain, sending the second TRN basic sub-sequence on the second transmit chain, sending the third TRN basic sub-sequence on the third transmit chain, and sending a fourth TRN basic sub-sequence on a fourth transmit chain; or if a value of A is 5, the transmission format of the TRN subfield is separately sending the first TRN basic sub-sequence on the first transmit chain in two time units, separately sending the second TRN basic sub-sequence on the second transmit chain in the two time units, separately sending the third TRN basic sub-sequence on the third transmit chain in the two time units, separately sending the fourth TRN basic sub-sequence on the fourth transmit chain in the two time units, and separately sending a fifth TRN basic sub-sequence on a fifth transmit chain in the two time units; and a mask used by the first TRN basic sub-sequence is [1, 1], a mask used by the second TRN basic sub-sequence is [1, 1], a mask used by the third TRN basic sub-sequence is [1, −1], a mask used by the fourth TRN basic sub-sequence is [1, −1], and a mask used by the fifth TRN basic sub-sequence is [1, 1]; or if a value of A is 6, the transmission format of the TRN subfield is separately sending the first TRN basic sub-sequence on the first transmit chain in the two time units, separately sending the second TRN basic sub-sequence on the second transmit chain in the two time units, separately sending the third TRN basic sub-sequence on the third transmit chain in the two time units, separately sending the fourth TRN basic sub-sequence on the fourth transmit chain in the two time units, separately sending the fifth TRN basic sub-sequence on the fifth transmit chain in the two time units, and separately sending a sixth TRN basic sub-sequence on a sixth transmit chain in the two time units; and a mask used by the first TRN basic sub-sequence is [1, 1], a mask used by the second TRN basic sub-sequence is [1, 1], a mask used by the third TRN basic sub-sequence is [1, −1], a mask used by the fourth TRN basic sub-sequence is [1, −1], a mask used by the fifth TRN basic sub-sequence is [1, 1], and a mask used by the sixth TRN basic sub-sequence is [1, 1]; or if a value of A is 7, the transmission format of the TRN subfield is separately sending the first TRN basic sub-sequence on the first transmit chain in the two time units, separately sending the second TRN basic sub-sequence on the second transmit chain in the two time units, separately sending the third TRN basic sub-sequence on the third transmit chain in the two time units, separately sending the fourth TRN basic sub-sequence on the fourth transmit chain in the two time units, separately sending the fifth TRN basic sub-sequence on the fifth transmit chain in the two time units, separately sending the sixth TRN basic sub-sequence on the sixth transmit chain in the two time units, and separately sending a seventh TRN basic sub-sequence on a seventh transmit chain in the two time units; and a mask used by the first TRN basic sub-sequence is [1, 1], a mask used by the second TRN basic sub-sequence is [1, 1], a mask used by the third TRN basic sub-sequence is [1, −1], a mask used by the fourth TRN basic sub-sequence is [1, −1], a mask used by the fifth TRN basic sub-sequence is [1, 1], a mask used by the sixth TRN basic sub-sequence is [1, 1], and a mask used by the seventh TRN basic sub-sequence is [1, −1]; or if a value of A is 8, the transmission format of the TRN subfield is separately sending the first TRN basic sub-sequence on the first transmit chain in the two time units, separately sending the second TRN basic sub-sequence on the second transmit chain in the two time units, separately sending the third TRN basic sub-sequence on the third transmit chain in the two time units, separately sending the fourth TRN basic sub-sequence on the fourth transmit chain in the two time units, separately sending the fifth TRN basic sub-sequence on the fifth transmit chain in the two time units, separately sending the sixth TRN basic sub-sequence on the sixth transmit chain in the two time units, separately sending the seventh TRN basic sub-sequence on the seventh transmit chain in the two time units, and separately sending an eighth TRN basic sub-sequence on an eighth transmit chain in the two time units; and a mask used by the first TRN basic sub-sequence is [1, 1], a mask used by the second TRN basic sub-sequence is [1, 1], a mask used by the third TRN basic sub-sequence is [1, −1], a mask used by the fourth TRN basic sub-sequence is [1, −1], a mask used by the fifth TRN basic sub-sequence is [1, 1), a mask used by the sixth TRN basic sub-sequence is [1, 1], a mask used by the seventh TRN basic sub-sequence is [1, −1], and a mask used by the eighth TRN basic sub-sequence is [1, −1].

To be specific, the transmission format of the TRN subfield may still be determined by using a total quantity of transmit chains; however, a relationship between the transmitted TRN subfield and a sequence mask is related to the quantity of transmit chains allocated to each channel. A length of the sequence sent on each transmit chain is shortened, so that transmission efficiency can also be improved.

In a possible design, when the channel transmission mode is the channel aggregation mode, a length of a Golay sequence included in the TRN subfield is TRN_BL×NCBj/2, TRN_BL is length information of the Golay sequence that is indicated in a header of the beam refinement protocol packet, NCBj is a quantity of consecutive channels used for transmitting the TRN subfield on a $j^{th}$ channel, the TRN subfield includes the Golay sequence, and j=1 or 2.

In this solution, the length of the transmitted TRN subfield is also shortened by shortening a length of a TRN basic sub-sequence. An advantage of the method is that descriptions about distinguishing between the CA mode and the CB mode can be reduced, and only the length of the Golay sequence is correspondingly scaled.

In a possible design, when the type of the antenna used for transmitting the TRN subfield is the dual polarization mode, the quantity of transmit chains used for transmitting the TRN subfield is equal to a quantity of transport streams of the TRN subfield, or it is determined that the quantity of transmit chains used for transmitting the TRN subfield is equal to a quantity of transport streams of the TRN subfield× 2.

In this manner, a quantity of transmit chains used for transmitting the TRN field is decoupled from a quantity of transmit chains used for transmitting the data field, so that independence between quantities of transmit chains in the two processes can be implemented to some extent, thereby implementing more flexible transmission.

In a possible design, when the quantity of transmit chains used for transmitting the TRN subfield is equal to the quantity of transport streams of the TRN subfield, the TRN subfield is used to perform a BRP TXSS process; or when the quantity of transmit chains used for transmitting the TRN subfield is equal to the quantity of transport streams of the TRN subfield×2, the TRN subfield is used to perform beam tracking.

In other words, the TRN subfield may have different uses. Certainly, the use of the TRN subfield is not limited thereto.

In a possible design, when the quantity of transmit chains used for transmitting the TRN subfield is equal to the quantity of transport streams of the TRN subfield×2, and A is an even number, two transmit chains in a same dual-polarized antenna use a same transmission format of the TRN subfield.

In this manner, it is ensured that the quantity of transmit chains used for transmitting the TRN subfield is equal to the quantity of transport streams of the TRN subfield×2, thereby implementing decoupling between the quantity of transmit chains used for transmitting the TRN field and the quantity of transmit chains used for transmitting the data field.

According to a third aspect, a device for sending a beam refinement protocol packet is provided. The device has a function of implementing the first device in the foregoing method designs. The function may be implemented by using hardware, or may be implemented by hardware executing corresponding software. The hardware or the software includes one or more units corresponding to the foregoing function.

In a possible design, a specific structure of the device may include a transceiver and a processor. The transceiver and the processor may perform corresponding functions in the method according to any one of the first aspect or the possible designs of the first aspect.

According to a fourth aspect, a device for receiving a beam refinement protocol packet is provided. The device has a function of implementing the second device in the foregoing method designs. The function may be implemented by using hardware, or may be implemented by hardware executing corresponding software. The hardware or the software includes one or more units corresponding to the foregoing function.

In a possible design, a specific structure of the device may include a transceiver and a processor. The transceiver and the processor may perform corresponding functions in the method according to any one of the second aspect or the possible designs of the second aspect.

According to a fifth aspect, a device for sending a beam refinement protocol packet is provided. The device has a function of implementing the first device in the foregoing method designs. The function may be implemented by using hardware, or may be implemented by hardware executing corresponding software. The hardware or the software includes one or more units corresponding to the foregoing function.

In a possible design, a specific structure of the device may include a transceiver unit and a processing unit. The transceiver unit and the processing unit may perform corresponding functions in the method according to any one of the first aspect or the possible designs of the first aspect.

According to a sixth aspect, a device for receiving a beam refinement protocol packet is provided. The device has a function of implementing the second device in the foregoing method designs. The function may be implemented by using hardware, or may be implemented by hardware executing corresponding software. The hardware or the software includes one or more units corresponding to the foregoing function.

In a possible design, a specific structure of the device may include a transceiver unit and a processing unit. The transceiver unit and the processing unit may perform corresponding functions in the method according to any one of the second aspect or the possible designs of the second aspect.

According to a seventh aspect, a communications apparatus is provided. The communications apparatus may be a first device or may be a chip in the first device. The communications apparatus has a function of implementing any one of the first aspect or the possible designs of the first aspect. The function may be implemented by using hardware, or may be implemented by hardware executing corresponding software. The hardware or the software includes one or more modules corresponding to the foregoing function.

In a possible design, when the communications apparatus is the first device, the first device includes a processing unit and a communications unit. The processing unit may be, for example, a processor. The communications unit may be, for example, a transceiver, and the transceiver includes a radio frequency circuit. Optionally, the first device further includes a storage unit, and the storage unit may be, for example, a memory. When the first device includes the storage unit, the storage unit is configured to store a computer-executable instruction, the processing unit is connected to the storage unit, and the processing unit executes the computer-executable instruction stored in the storage unit, so that the first device performs a wireless communication method according to any possible design of the first aspect.

In another possible design, when the communications apparatus is the chip in the first device, the chip includes a processing unit and a communications unit. The processing unit may be, for example, a processor. The communications unit may be, for example, an input/output interface, a pin, or a circuit. The processing unit may execute a computer-executable instruction stored in a storage unit, so that the chip in the first device performs the method for sending a beam refinement protocol packet according to any possible design of the first aspect. Optionally, the storage unit is a storage unit in the chip, for example, a register or a cache. The storage unit may alternatively be a storage unit that is in the first device and that is outside the chip, for example, a ROM, another type of static storage device that can store static information and an instruction, or a RAM.

The processor mentioned in any of the foregoing possible designs may be a general-purpose CPU, a microprocessor, an ASIC, or one or more integrated circuits that are configured to control execution of a program of a wireless communication method according to the first aspect.

According to an eighth aspect, a communications apparatus is provided. The communications apparatus may be a second device or may be a chip in the second device. The communications apparatus has a function of implementing any one of the second aspect or the possible designs of the second aspect. The function may be implemented by using hardware, or may be implemented by hardware executing corresponding software. The hardware or the software includes one or more modules corresponding to the foregoing function.

In a possible design, when the communications apparatus is the second device, the second device includes a processing unit and a communications unit. The processing unit may be, for example, a processor. The communications unit may be, for example, a transceiver, and the transceiver includes a radio frequency circuit. Optionally, the second device further includes a storage unit, and the storage unit may be, for example, a memory. When the second device includes the storage unit, the storage unit is configured to store a computer-executable instruction, the processing unit is connected to the storage unit, and the processing unit executes the computer-executable instruction stored in the storage unit, so that the second device performs a wireless communication method according to any possible design of the second aspect.

In another possible design, when the communications apparatus is the chip in the second device, the chip includes a processing unit and a communications unit. The processing unit may be, for example, a processor. The communications unit may be, for example, an input/output interface, a pin, or a circuit. The processing unit may execute a computer-executable instruction stored in a storage unit, so that the chip in the second device performs the method for receiving a beam refinement protocol packet according to any possible design of the second aspect. Optionally, the storage unit is a storage unit in the chip, for example, a register or a cache. The storage unit may alternatively be a storage unit that is in the second device and that is outside the chip, for example, a ROM, another type of static storage device that can store static information and an instruction, or a RAM.

The processor mentioned in any of the foregoing possible designs may be a general-purpose CPU, a microprocessor, an ASIC, or one or more integrated circuits that are configured to control execution of a program of a wireless communication method according to the second aspect.

According to a ninth aspect, a communications system is provided. The communications system may include a first device and a second device. The first device is configured to: determine a transmission format of a beam training TRN subfield based on first information, where the first information includes at least one of information indicating a quantity of transmit chains used for transmitting the TRN subfield on each channel, information indicating a type of an antenna used for transmitting the TRN subfield, and information indicating a channel transmission mode; and the channel transmission mode is a channel bonding mode or a channel aggregation mode, and the type of the antenna is a single polarization mode or a dual polarization mode; and send a beam refinement protocol packet to the second device on a transmit chain based on the transmission format, where the beam refinement protocol packet includes a data field and a TRN field, and the TRN field includes a plurality of TRN subfields. The second device is configured to: receive notification signaling sent by the first device, where the notification signaling is used to indicate the transmission format of the beam training TRN subfield in the beam refinement protocol packet sent by the first device; the transmission format is determined based on the first information, and the first information includes the at least one of the information indicating the quantity of transmit chains used for transmitting the TRN subfield on each channel, the information indicating the type of the antenna used for transmitting the TRN subfield, and the information indicating the channel transmission mode; and the channel transmission mode is the channel bonding mode or the channel aggregation mode, and the type of the antenna is the single polarization mode or the dual polarization mode; and receive, based on the transmission format, the beam refinement protocol packet sent by the first device on the transmit chain, where the beam refinement protocol packet includes the data field and the TRN field, and the TRN field includes the plurality of TRN subfields.

According to a tenth aspect, a computer-readable storage medium is provided. The computer-readable storage medium stores an instruction, and when the instruction is run on a computer, the computer is enabled to perform the method according to any one of the first aspect or the possible designs of the first aspect.

According to an eleventh aspect, a computer-readable storage medium is provided. The computer-readable storage medium stores an instruction, and when the instruction is run on a computer, the computer is enabled to perform the method according to any one of the second aspect or the possible designs of the second aspect.

According to a twelfth aspect, a computer-readable program product including an instruction is provided. The computer program product stores the instruction, and when the instruction is run on a computer, the computer is enabled to perform the method according to any one of the first aspect or the possible designs of the first aspect.

According to a thirteenth aspect, a computer-readable program product including an instruction is provided. The computer program product stores the instruction, and when the instruction is run on a computer, the computer is enabled to perform the method according to any one of the second aspect or the possible designs of the second aspect.

In the embodiments of this application, the beam refinement protocol packet supports the transmission format of the multi-channel transmission and the multi-antenna transmission, so that the first device may send the beam refinement protocol packet to the second device by using the determined transmission format, thereby improving the beam training and beam tracking efficiency.

DESCRIPTION OF EMBODIMENTS

Figure 1:
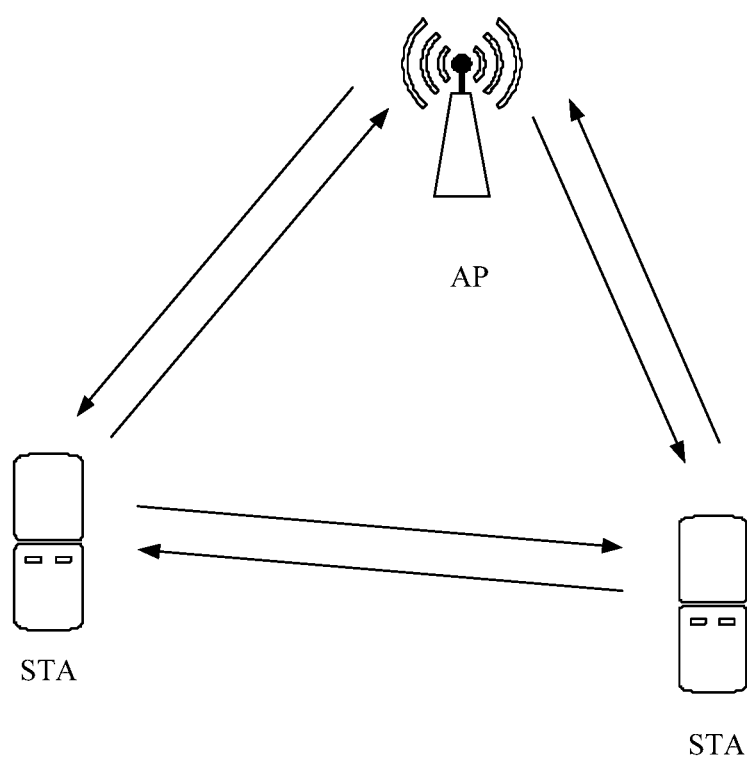
FIG. 1 is a schematic diagram of an application scenario according to an embodiment of this application.

To make the objectives, technical solutions, and advantages of the embodiments of this application clearer, the following further describes the embodiments of this application in detail with reference to the accompanying drawings.

Some terms in the embodiments of this application are explained below to help a person skilled in the art understand.

(1) AP: An AP is equivalent to a hub (HUB) in a conventional wired network, and is also a device most commonly used for setting up a small wireless local area network. The AP is equivalent to a bridge connecting a wired network to a wireless network, and a main function of the AP is connecting clients of a wireless network together, and then connecting the wireless network to the Ethernet.

Most wireless APs support functions such as multi-user access, data encryption, and multi-rate sending, and some products further provide a complete wireless network management function. For a small-range wireless local area network such as a home or an office, usually only one wireless AP may be required for implementing wireless access of all computers.

An indoor coverage range of the AP is usually 30 m to 100 m, and AP products of many vendors may be interconnected to increase a coverage area of a wireless local area network (WLAN). A coverage range of each AP is limited, and therefore, just as a mobile phone can roam between base stations, a wireless local area network client can also roam between APs.

(2) STA: A WLAN mainly includes a STA, an AP, a wireless medium (WM), and a distribution system (DS). The STA is usually a client, such as a computer in which a wireless network interface card is installed or a smartphone having a wireless fidelity (wireless-fidelity, Wi-Fi) module, in the WLAN. The STA may be movable or may be fixed. The STA is a most essential composition unit of the wireless local area network. A STA may access a wireless network by using an AP. To be specific, the STA may communicate with the AP, and STAs may also communicate with each other.

In this embodiment of this application, a first device may be an AP or a STA. Similarly, a second device may also be a STA or an AP. For example, when the first device is an AP, the second device is a STA; or when the first device is a STA, the second device is an AP or a STA.

(3) BRP: A BRP is an entire set of protocols for enabling beam refinement between a receiver and a transmitter. One or more BRP frames or BRP packets are receiver or sent by using the receiver and the transmitter, so that beam training and beam tracking processes of the receiver and the transmitter can be performed.

(4) BRP packet: A BRP packet is a packet that can implement beam training and beam tracking, and may be understood as a PPDU including a TRN field. To be specific, if a PPDU carries a TRN field, the PPDU may be referred to as a BRP packet. The receiver or the transmitter can perform channel measurement and tracking on different beams by using the BRP packet. A type of the BRP packet is classified into a BRP TX, a BRP RX, and a BRP TX-RX, to separately implement transmit beam training, receive beam training, and receive/transmit beam training.

(5) PPDU: A PPDU usually includes a preamble, a header, and a data field. The PPDU may further include a TRN (training) field. When a PPDU includes a TRN field, the PPDU is also referred to as a BRP packet. The header herein includes a multi-gigabit (directional multi-gigabit, DMG) header and an enhanced gigabit (enhanced directional multi-gigabit, EDMG) header.

(6) BRP frame: To implement the BRP, a Media Access Control (MAC) layer needs to send some pieces of information to coordinate a receive end and a transmit end to perform beam refinement. These pieces of information may be carried by using the BRP frame. If one PPDU carries one or more procedure parameters used by the receive end and the transmit end for sending one or more BRP packets, the PPDU may be referred to as a BRP frame.

(7) BRP transmit sector sweep (tTXSS): BRP TXSS is a process of performing transmit sector sweep by using the BRP protocol.

(8) Channel and channel division: In the IEEE 802.11ay standard, six channels having a 2.16 GHz bandwidth, to be specific, 57.24-59.4 GHz, 59.4-61.56 GHz, 61.56-63.72 GHz, 63.72-65.88 GHz, 65.88-68.04 GHz, and 68.04-70.2 GHz; five channels having a 4.32 GHz bandwidth, to be specific, 57.24-61.56 GHz, 61.56-65.88 GHz, 65.88-70.2 GHz, 59.4-63.72 GHz, and 63.72-68.04 GHz; four channels having a 6.48 GHz bandwidth, to be specific, 57.24-63.72 GHz, 61.56-70.2 GHz, 59.4-65.88 GHz, and 63.72-70.2 GHz; and three channels having an 8.64 GHz bandwidth, to be specific, 57.24-65.88 GHz, 59.4-68.04 GHz, and 61.56-70.2 GHz, are obtained through division.

(9) The terms "system" and "network" may be used interchangeably in the embodiments of this application. A "plurality of" refers to two or more. In view of this, in the embodiments of this application, the "plurality of" may also be understood as "at least two". The term "and/or" describes an association relationship for describing associated objects and represents that three relationships may exist. For example, A and/or B may represent the following three cases: Only A exists, both A and B exist, and only B exists. In addition, unless otherwise specified, the character "/" generally indicates an "or" relationship between associated objects.

Unless otherwise stated, ordinal numbers such as "first", "second", and the like mentioned in the embodiments of this application are used for distinguishing between a plurality of objects without limiting a sequence, a time sequence, priorities, or importance levels of the plurality of objects.

The technical solutions provided in this specification can be applied to a 5th generation (5$^{th}$ Generation, 5G) system, and provide a transmission rate in gigabits as a supplemental technology of 5G new radio (New Radio, NR) in a high-frequency unlicensed band 60 GHz.

In the IEEE 802.11 ay D0.5, a transmission format of a TRN subfield is determined based on a total quantity of transmit chains. Specifically, Table 1 shows a mapping relationship between a transmission format of a TRN subfield and a total quantity of transmit chains.

To be specific, the TRN subfield includes the TRN basic sub-sequence. [$TRN_{basic}^1$, $TRN_{basic}^1$] indicates separately sending a TRN basic sub-sequence $TRN_{basic}^1$ in two time units. For other TRN subfields, the rest may be deduced by analogy. The i$^{th}$ TRN basic sub-sequence $TRN_{basic}^i = [Ga_N^i, -Gb_N^i, Ga_N^i, Gb_N^i, Ga_N^i, -Gb_N^i]$, where both Ga and Gb are Golay sequences (golay sequences). For the Golay sequence, refer to definitions in the protocol. N indicates a length of the Golay sequence, and N=TRN_BL×NCB, where TRN_BL=128, 64, or 256. A default length of TRN_BL is 128, or a length of TRN_BL may be notified as 64 or 256 by additionally using signaling. NCB is a quantity of consecutive 2.16 GHz channels used for transmitting the TRN subfield, where 1≤NCB≤4.

It should be noted that, two multi-channel transmission manners are introduced into the IEEE 802.11ay: channel bonding (CB) of a plurality of 2.16 GHz channels, which becomes a broadband signal transmission mode; and a two-channel aggregation (Channel Aggregation, CA) transmission mode. In the CB mode, a plurality of adjacent channels may be used as a broadband channel for transmission. For the CA mode, only a case in which transmit chains are evenly allocated to two equal-bandwidth channels participating in CB is currently supported, to be specific, a total quantity of the transmit chains is an even number, former $N_{TX}/2$ transmit chains are allocated to a primary channel for signal transmission, and latter $N_{TX}/2$ transmit chains are allocated to a secondary channel for signal transmission. For the CA mode, two aggregated channel bandwidths are equal

TABLE 1

| Total quntity of transmit chains (Total quantity of transmit chains) | Transmit chain number (Transmit chain number) | TRN subfield definition (TRN subfield) |
|---|---|---|
| 1, 2 | 1 | $TRN_{basic}^1$ |
|  | 2 | $TRN_{basic}^2$ |
| 3, 4 | 1 | [$TRN_{basic}^1$, $TRN_{basic}^1$] |
|  | 2 | [$TRN_{basic}^2$, $TRN_{basic}^2$] |
|  | 3 | [$TRN_{basic}^3$, $-TRN_{basic}^3$] |
|  | 4 | [$TRN_{basic}^4$, $-TRN_{basic}^4$] |
| 5, 6, 7, 8 | 1 | [$TRN_{basic}^1$, $TRN_{basic}^1$, $TRN_{basic}^1$, $TRN_{basic}^1$] |
|  | 2 | [$TRN_{basic}^2$, $TRN_{basic}^2$, $TRN_{basic}^2$, $TRN_{basic}^2$] |
|  | 3 | [$TRN_{basic}^3$, $-TRN_{basic}^3$, $TRN_{basic}^3$, $-TRN_{basic}^3$] |
|  | 4 | [$TRN_{basic}^4$, $-TRN_{basic}^4$, $TRN_{basic}^4$, $-TRN_{basic}^4$] |
|  | 5 | [$TRN_{basic}^5$, $TRN_{basic}^5$, $-TRN_{basic}^5$, $-TRN_{basic}^5$] |
|  | 6 | [$TRN_{basic}^6$, $TRN_{basic}^6$, $-TRN_{basic}^6$, $-TRN_{basic}^6$] |
|  | 7 | [$TRN_{basic}^7$, $-TRN_{basic}^7$, $-TRN_{basic}^7$, $TRN_{basic}^7$] |
|  | 8 | [$TRN_{basic}^8$, $-TRN_{basic}^8$, $-TRN_{basic}^8$, $TRN_{basic}^8$] |

The total quantity of transmit chains may be understood as a total quantity of transmit chains used for transmitting the TRN subfield. The transmit chain number refers to a number of a transmit chain. It can be learned from Table 1 that, if the total quantity of transmit chains is 1, the transmission format of the TRN subfield is sending $TRN_{basic}^1$ on a transmit chain 1 by a transmit end; if the total quantity of transmit chains is 2, the transmission format of the TRN subfield is sending $TRN_{basic}^1$ on the transmit chain 1 and sending $TRN_{basic}^2$ on a transmit chain 2 by the transmit end; if the total quantity of transmit chains is 3, the transmission format of the TRN subfield is sending [$TRN_{basic}^1$, $TRN_{basic}^1$] on the transmit chain 1, sending [$TRN_{basic}^2$, $TRN_{basic}^2$] on the transmit chain 2, and sending [$TRN_{basic}^3$, $-TRN_{basic}^3$] on a transmit chain 3 by the transmit end. The rest may be deduced by analogy.

$TRN_{basic}^i$ is referred to as an i$^{th}$ TRN basic sub-sequence, and the TRN subfield is transmitted on each transmit chain.

channel bandwidths. The CA mode includes two modes: CA of two 2.16 GHz channels or CA of two 4.32 GHz channels.

For example, if four transmit chains transmit signals through two consecutive 2.16 GHz channels in the CB mode, the four transmit chains send signals on a channel having a 4.32 GHz bandwidth. To be specific, the total quantity of transmit chains is 4 and NCB=2. Therefore, TRN subfields transmitted on the transmit chains are respectively [$TRN_{basic}^1$, $TRN_{basic}^1$] transmitted on the transmit chain 1, [$TRN_{basic}^2$, $TRN_{basic}^2$] transmitted on the transmit chain 2, [$TRN_{basic}^3$, $-TRN_{basic}^3$] transmitted on the transmit chain 3, and [$TRN_{basic}^4$, $-TRN_{basic}^4$] transmitted on a transmit chain 4. When TRN_BL=128, the length of the Golay sequence N=128*2.

Alternatively, if four transmit chains are transmitted through two consecutive 2.16 GHz channels in the CA mode, to be specific, a 2.16 GHz+2.16 GHz transmission mode, the four transmit chains are allocated to a primary channel and a secondary channel. The transmit chains 1 and 2 are allocated to the primary channel, and a bandwidth of the primary channel is 2.16 GHz. The transmit chains 3 and 4 are allocated to the secondary channel, and a bandwidth of the secondary channel is also 2.16 GHz. Therefore, TRN subfields transmitted on the transmit chains are respectively $[TRN_{basic}^1, TRN_{basic}^1]$ transmitted on the transmit chain 1, $[TRN_{basic}^2, TRN_{basic}^2]$ transmitted on the transmit chain 2, $[TRN_{basic}^3, TRN_{basic}^3]$ transmitted on the transmit chain 3, and $[TRN_{basic}^4, -TRN_{basic}^4]$ transmitted on the transmit chain 4. When TRN_BL=128, the length of the Golay sequence N=128*2.

It can be learned that, Table 1 is defined in the IEEE 802.11 lay D0.5 for sending the TRN subfield. Regardless of the CA mode or the CB mode, the transmission format of the TRN subfield is determined based on the total quantity of transmit chains. For the CA mode, a quantity of transmit chains on each channel is only half of that in the CB mode, provided that the total quantity of transmit chains is greater than or equal to 2. For each channel, in the CA mode, a length of the TRN subfield that needs to be sent is twice longer than a length of the TRN subfield sent in the CB mode having a same bandwidth and a same quantity of antennas. Consequently, in the CA mode, TRN-based measurement efficiency is low.

In addition, a manner of transmitting the TRN subfield may further be related to an antenna polarization manner. Therefore, the transmission format of the TRN subfield further needs to be determined based on a specific polarization manner.

In view of this, the embodiments of this application further provide some technical solutions, to provide a TRN transmission format applicable to the CA mode, thereby improving efficiency.

An application scenario according to an embodiment of this application is described below. FIG. 1 is a schematic diagram of the application scenario. FIG. 1 includes an AP and two STAs. The AP may send a BRP packet to the STA, or the STA may send a BRP packet to the AP, or the STA may send a BRP packet to another STA.

The technical solutions provided in the embodiments of this application are described below in detail with reference to the accompanying drawings. It should be noted that a method for sending a beam refinement protocol packet and a method for receiving a beam refinement protocol packet provided in the embodiments of this application may be performed by apparatuses. The apparatus may be an AP or a chip in the AP, to be specific, the method for sending a beam refinement protocol packet or the method for receiving a beam refinement protocol packet provided in the embodiments of this application may be performed by the AP or the chip in the AP; or the apparatus may be a STA or a chip in the STA, to be specific, the method for sending a beam refinement protocol packet or the method for receiving a beam refinement protocol packet provided in the embodiments of this application may be performed by the STA or the chip in the STA.

For ease of description, in the embodiments of this application, the method for sending a beam refinement protocol packet and the method for receiving a beam refinement protocol packet are described by using an example in which the apparatus is an AP or a STA. For implementation methods when the apparatus is a chip in the AP or a chip in the STA, refer to specific descriptions of the method for sending a beam refinement protocol packet or the method for receiving a beam refinement protocol packet performed by the AP or the STA, and details are not described again.

Figure 2:
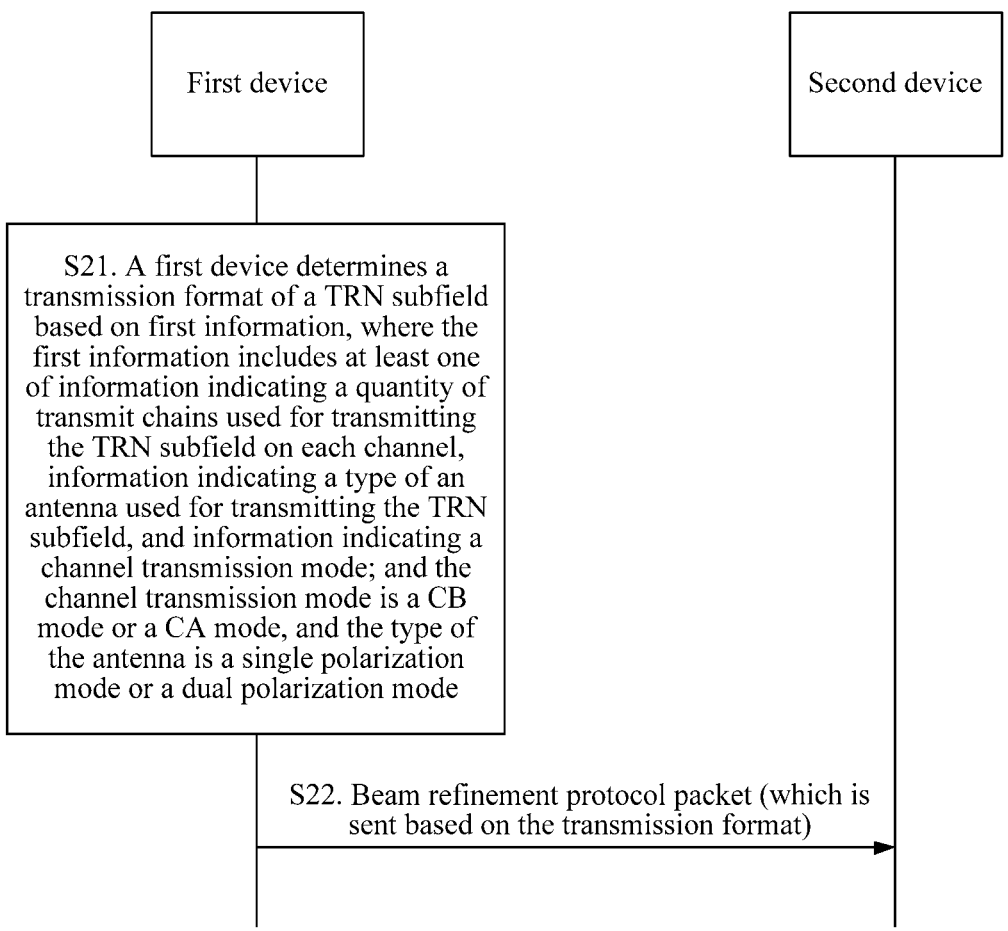
FIG. 2 is a flowchart of a method for sending a beam refinement protocol packet according to an embodiment of this application.

Referring to FIG. 2, an embodiment of this application provides a method for sending a beam refinement protocol packet. In a process described below, an example in which the method is applied to the application scenario shown in FIG. 1 is used, and a TRN subfield discussed in this application may be all TRN subfields included a TRN field, or may be some of TRN subfields included in a TRN field. A procedure of the method is described as follows.

S21: A first device determines a transmission format of a TRN subfield based on first information, where the first information includes at least one of information indicating a quantity of transmit chains used for transmitting the TRN subfield on each channel, information indicating a type of an antenna used for transmitting the TRN subfield, and information indicating a channel transmission mode; and the channel transmission mode is a CB mode or a CA mode, and the type of the antenna is a single polarization mode or a dual polarization mode.

Before sending a BRP packet, the first device may first determine a transmission format of a TRN subfield in a TRN field included in the BRP packet. The TRN subfield herein may be all TRN subfields included in the TRN field, or some of TRN subfields included in the TRN field.

In an example, when the channel transmission mode is the CA mode, the transmission format of the TRN subfield may be determined by using a total quantity of transmit chains, or may be determined by using the quantity of transmit chains used for transmitting the TRN subfield on each channel. Certainly, if the quantity of transmit chains used for transmitting the TRN subfield on each channel is learned of, the total quantity of transmit chains used for transmitting the TRN subfield may also be determined. A quantity of transmit chains for a PPDU may be carried in a header of the BRP packet. In a process of sending the BRP packet, no change in the quantity of transmit chains is allowed, to be specific, transmit chains used for sending a data field and the TRN field of the BRP packet are the same.

For example, channels participating in CA include a first channel and a second channel, so that a quantity of transmit chains used for transmitting the TRN subfield on a channel having a relatively large bandwidth is $\lceil A/2 \rceil$, and a quantity of transmit chains used for transmitting the TRN subfield on a channel having a relatively small bandwidth is $\lfloor A/2 \rfloor$, where $\lceil \ \rceil$ indicates rounding up, $\lfloor \ \rfloor$ indicates rounding down, A indicates the quantity of transmit chains used for transmitting the TRN subfield, to be specific, the total quantity of transmit chains, and A is an integer greater than 1 and less than or equal to 8. Therefore, if a bandwidth of the first channel is greater than or equal to a bandwidth of the second channel, a quantity of transmit chains used for transmitting the TRN subfield on the first channel is $\lceil A/2 \rceil$, and a quantity of transmit chains used for transmitting the TRN subfield on the second channel is $\lfloor A/2 \rfloor$. If a bandwidth of the first channel is less than or equal to a bandwidth of the second channel, a quantity of transmit chains used for transmitting the TRN subfield on the first channel is $\lceil A/2 \rceil$, and a quantity of transmit chains used for transmitting the TRN subfield on the second channel is $\lfloor A/2 \rfloor$. In this manner, a relatively large quantity of transmit chains can be allocated to a channel having a relatively large bandwidth, to fully use bandwidth resources.

According to the prior art, the two channels participating in the CA should be two equal-bandwidth channels. For example, the CA is CA of two 2.16 GHz channels or CA of two 4.32 GHz channels. However, in a 60 GHz millimeter-wave band, a bandwidth of each channel is 2.16 GHz. To support four consecutive channels having a bandwidth of 8.64 GHz, a challenge to an analog-to-digital converter (ADC)/digital-to-analog converter (DAC) is very great. In an engineering compromise manner, the ADC/DAC can support a plurality of 4.32 GHz receive channels or transmit channels. To be specific, CB whose total bandwidth is 4.32 GHz can be implemented, and CA of two 2.16 GHz channels or CA of two 4.32 GHz channels may be further implemented. A system throughput is increased by increasing the bandwidth.

However, if only three consecutive medium-idle channels are actually detected, assuming that a propagation channel environment supports transmission of one stream of independent data, one device capable of supporting two 4.32 GHz radio frequency chains can work on only a channel having a 4.32 GHz transmit chain, based on a current manner in which CA supports two equal-bandwidth channels. This is equivalent to a case that a capability of a radio frequency chain is wasted. However, the capability of the device can support 4.32 GHz (primary channel)+2.16 GHz, or support 2.16 GHz (primary channel)+4.32 GHz. Bandwidths of different channels may be different based on the manner provided in this embodiment of this application. Therefore, two transmit chains may respectively work on a 4.32 GHz channel and a 2.16 GHz channel, thereby fully using the channels. A radio frequency chain may include a transmit chain and a receive chain.

Further, if a quantity of radio frequency chains is an odd number, a quantity of transmit chains allocated to one channel is certainly greater than a quantity of transmit chains allocated to another channel. Therefore, a principle herein is allocating more transmit chains and channels to a channel having a larger bandwidth. For example, if a capability of a device supports three 4.32 GHz transmit chains, two of the transmit chains may be allocated to a 4.32 GHz channel, and a remaining transmit chain is allocated to a 2.16 GHz channel, to obtain a larger throughput.

All radio frequency chains need to support a basic 2.16 GHz channel. Therefore, a 4.32 GHz transmit chain may be understood as a radio frequency capability that has a maximum bandwidth of 4.32 GHz and that is backward compatible with a 2.16 GHz bandwidth capability.

It can be learned that a TRN subfield=a mask*a TRN basic sub-sequence. In an embodiment, a TRN basic sub-sequence transmitted by using each antenna is determined by using a transmit chain index on each channel, and a mask length is determined by using the quantity of transmit chains on each channel. When Bj=1 or 2, a length of a mask sequence is 1; or when Bj=3 or 4, a length of a mask sequence is 2. A length of a Golay sequence in each TRN basic sub-sequence is determined by using a bandwidth of each channel. Bj indicates a quantity of transmit chains used for transmitting the TRN subfield on a $j^{th}$ channel participating in the channel aggregation. The transmit chain index is a number of a transmit chain. It may be understood that, different from the CB mode, the transmit chain index is independently numbered on each channel, so that transmit chain sequence numbers on a primary channel and a secondary channel are repeated.

Specifically, Table 2 shows a mapping relationship between a transmission format of a TRN subfield and a total quantity of transmit chains in the CA mode.

TABLE 2

| [A/2] or Total number of transmit chains per channel (Total quantity of transmit chains on each channel) | Transmit chain index | TRN subfield definition |
|---|---|---|
| 1, 2 | 1 | $TRN_{basic}^{1}$ |
|  | 2 | $TRN_{basic}^{2}$ |
| 3, 4 | 1 | $[TRN_{basic}^{1}, TRN_{basic}^{1}]$ |
|  | 2 | $[TRN_{basic}^{2}, TRN_{basic}^{2}]$ |
|  | 3 | $[TRN_{basic}^{3}, -TRN_{basic}^{3}]$ |
|  | 4 | $[TRN_{basic}^{4}, -TRN_{basic}^{4}]$ |

It can be learned from Table 2 that, if a value of [A/2] or Bj is 1, the transmission format of the TRN subfield is sending a first TRN basic sub-sequence on a first transmit chain; or if a value of [A/2] or Bj is 2, the transmission format of the TRN subfield is sending a first TRN basic sub-sequence on a first transmit chain, and sending a second TRN basic sub-sequence on a second transmit chain; or if a value of [A/2] or Bj is 3, the transmission format of the TRN subfield is separately sending a first TRN basic sub-sequence on a first transmit chain in two time units, separately sending a second TRN basic sub-sequence on a second transmit chain in the two time units, and separately sending a third TRN basic sub-sequence on a third transmit chain in the two time units; and a mask used by a first TRN subfield is [1, 1], a mask used by a second TRN subfield is [1, 1], and a mask used by a third TRN subfield is [1, −1]; or if a value of [A/2] or Bj is 4, the transmission format of the TRN subfield is separately sending a first TRN basic sub-sequence on a first transmit chain in two time units, separately sending a second TRN basic sub-sequence on a second transmit chain in the two time units, separately sending a third TRN basic sub-sequence on a third transmit chain in the two time units, and separately sending a fourth TRN basic sub-sequence on a fourth transmit chain in the two time units; and a mask used by the first TRN basic sub-sequence is [1, 1], a mask used by the second TRN basic sub-sequence is [1, 1], a mask used by the third TRN basic sub-sequence is [1, −1], and a mask used by the fourth TRN basic sub-sequence is [1, −1]. The first transmit chain is a transmit chain whose transmit chain index is 1. The rest may be deduced by analogy. The first TRN basic sub-sequence is $TRN_{basic}^{1}$, the second TRN basic sub-sequence is $TRN_{basic}^{2}$, the third TRN basic sub-sequence is $TRN_{basic}^{3}$, and the fourth TRN basic sub-sequence is $TRN_{basic}^{4}$. A mask used by a TRN basic sub-sequence may be a mask used by a TRN subfield including the TRN basic sub-sequence. To be specific, the mask*the TRN basic sub-sequence=the TRN subfield.

A time unit is a time occupied by a TRN basic sub-sequence. Other definitions are the same as those in Table 1. An $i^{th}$ basic sub-sequence $TRN_{basic}^{i}=[Ga_{N}^{i}, -Gb_{N}^{i}, Ga_{N}^{i}, Gb_{N}^{i}, Ga_{N}^{i}, -Gb_{N}^{i}]$, where Ga and Gb are Golay sequences. For the Golay sequence, refer to definitions in the protocol. Nj indicates a length of a Golay sequence of the $j^{th}$ channel participating in the channel aggregation, and Nj=TRN_BL× NCBj, where TRN_BL=128, 64, or 256. A default length of TRN_BL is 128, or a length of TRN_BL may be notified as 64 or 256 by additionally using signaling. NCBj indicates a quantity of consecutive channels used for transmitting the TRN subfield on the $j^{th}$ aggregated channel participating in the CA, and bandwidths of all the consecutive channels are 2.16 GHz, where 1≤NCBj≤4 and j=1 or 2.

In the foregoing example, the $i^{th}$ basic sub-sequence $TRN_{basic}^{i}$ includes six Golay sequences. In another example, a quantity of Golay sequences included in the $i^{th}$ basic sub-sequence $TRN_{basic}^{i}$ may alternatively be less than 6. For example, five Golay sequences are included. For example, the $i^{th}$ basic sub-sequence $TRN_{basic}^{i}=[Ga_N^i, -Gb_N^i, Ga_N^i, Gb_N^i, Ga_N^i]$ or the $i^{th}$ basic sub-sequence $TRN_{basic}^{i}=[-Gb_N^i, Ga_N^i, Gb_N^i, Ga_N^i, -Gb_N^i]$.

Bj indicates the quantity of transmit chains used for transmitting the TRN subfield on the $j^{th}$ channel participating in the channel aggregation, and similarly, j=1 or 2. To be specific, the quantity of transmit chains on each channel in the CA mode described in this embodiment of this application may be understood as the quantity of transmit chains on the $j^{th}$ channel participating in the CA. Quantities of transmit chains on different channels participating in the CA may be the same or may be different. Currently, only channel aggregation of two channels is supported, it may be understood that B=⌈A/2⌉ and B2=⌊A/2⌋ or B1=⌊A/2⌋ and B2=⌈A/2⌉, and when A is an even number, ⌈A/2⌉=⌊A/2⌋. It can be learned that in this embodiment of this application, if the channel transmission mode is the CA mode, the TRN subfield to be transmitted on each transmit chain is equivalent to that when the channel transmission mode is the CB mode. This is equivalent to shortening a length of the TRN subfield in the CA mode, thereby improving beam training efficiency in the CA mode.

In this embodiment of this application, the transmit chain index is independently numbered on each channel, so that transmit chain sequence numbers on the primary channel and the secondary channel are repeated. The transmit chain index may be carried in the BRP packet, to instruct a receive end to obtain information about a transmit antenna chain of a transmit end. For example, each transmit chain index needs to be represented by using K bits. The CB mode is independent of the channel. However, for the CA mode, a corresponding receive chain needs to be received through a corresponding channel, and if the corresponding receive chain is received through a wrong channel, no signal may be received. Therefore, before sending the BRP packet, the first device may determine, by negotiating with a second device by using a BRP frame, transmit chains allocated to the primary channel and transmit chains allocated to the secondary channel for the subsequent BRP packet, and add the transmit chain index to the BRP packet. For example, assuming that there are a maximum of eight transmit chains in the IEEE 802.1 lay, each transmit chain index needs to be represented by using three bits, and a maximum of four transmit chains are allocated to each channel, indexes of the four transmit chains may be represented by using 12 bits. From a perspective of the total quantity of transmit chains of the device, it may alternatively be pre-agreed that former B1 transmit chains are transmitted through the primary channel, and latter B1 transmit chains are transmitted through the secondary channel.

In addition, for a CB scenario, configurations of transmit chains used on channels participating in CB are the same, and in this case, it may be considered that total lengths of BRP packets transmitted through channels participating the CB may be the same. It may be noted that when A is an odd number, transmit chains allocated to two aggregated channels are different. In some cases, for example, A=5, duration occupied by TRN fields on the two channels are different. A relatively simple method is that a TRN format is calculated based on ⌈A/2⌉, so that the duration occupied by the TRN subfields on the two channels is the same.

In addition, for a CA scenario, in this application, different antennas connected to different radio frequency chains are allocated to different channels, and quantities of sectors that need to be trained on the antennas are certainly different. Consequently, lengths of TRN fields transmitted through two channels are different, and a case in which BRP packets transmitted through different channels cannot be aligned may occur. Therefore, in this embodiment of this application, to align lengths of BRP packets transmitted through the two aggregated channels, total lengths of the BRP packets transmitted through the two channels participating in the CA may be equalized. This application provides an implementation, that is, the first device sends indication information to the second device, to separately indicate quantities of transmit chains allocated to a primary channel and a secondary channel that participate in CA, and lengths of TRN fields and lengths of data fields on the primary channel and secondary channel. In this way, the second device may correspondingly receive corresponding fields through the primary channel and secondary channel by using the indication information. However, another device may alternatively obtain total length information by parsing a header of a BRP packet, to set a network allocation vector (NAV).

It should be noted that, one BRP packet is transmitted once through channels participating in CA, and the BRP packet is transmitted through the plurality of channels participating in the CA together. However, one BRP packet is transmitted through each channel participating in the CA. To distinguish between these concepts, a packet that is transmitted through a plurality of channels participating in CA may be referred to as a BRP packet, and a packet transmitted through each channel in one transmission process is referred to as a sub-BRP-packet. To be specific, the BRP packet includes the sub-BRP-packet. Therefore, in this embodiment of this application, a total length of a sub-BRP-packet transmitted through a first channel needs to be made equal to a total length of a sub-BRP-packet transmitted through a second channel, and the sub-BRP-packet transmitted through the first channel and the sub-BRP-packet transmitted through the second channel are composition parts of the BRP packet transmitted this time.

It may be understood that the TRN subfield=a mask*a TRN basic sub-sequence. In an embodiment, the TRN basic sub-sequence is determined by using a transmit chain sequence number determined by using a total quantity of transmit chains, and a mask length is determined by using a quantity of antennas on each channel. When Bj=1 or 2, a length of a mask sequence is 1; or when Bj=3 or 4, a length of a mask sequence is 2. A length of a Golay sequence in each TRN basic sub-sequence is determined by using a bandwidth of each channel.

In another example, when the channel transmission mode is the CA mode, the transmission format of the TRN subfield may be determined by using the total quantity of transmit chains. Table 3 shows a mapping relationship between a transmission format of a TRN subfield and a total quantity of transmit chains in the CA mode.

TABLE 3

| Total quantity of transmit chains | Transmit chain number | TRN subfield definition |
|---|---|---|
| 2, 3, 4 | 1 | $TRN_{basic}^{1}$ |
|  | 2 | $TRN_{basic}^{2}$ |
|  | 3 | $TRN_{basic}^{3}$ |
|  | 4 | $TRN_{basic}^{4}$ |

TABLE 3-continued

| Total quantity of transmit chains | Transmit chain number | TRN subfield definition |
|---|---|---|
| 5, 6, 7, 8 | 1 | $[TRN_{basic}^1, TRN_{basic}^1]$ |
|  | 2 | $[TRN_{basic}^2, TRN_{basic}^2]$ |
|  | 3 | $[TRN_{basic}^3, -TRN_{basic}^3]$ |
|  | 4 | $[TRN_{basic}^4, -TRN_{basic}^4]$ |
|  | 5 | $[TRN_{basic}^5, TRN_{basic}^5]$ |
|  | 6 | $[TRN_{basic}^6, TRN_{basic}^6]$ |
|  | 7 | $[TRN_{basic}^7, -TRN_{basic}^7]$ |
|  | 8 | $[TRN_{basic}^8, -TRN_{basic}^8]$ |

It can be learned from Table 3 that, if a value of A is 2, the transmission format of the TRN subfield is sending a first TRN basic sub-sequence on a first transmit chain, and sending a second TRN basic sub-sequence on a second transmit chain; or if a value of A is 3, the transmission format of the TRN subfield is sending a first TRN basic sub-sequence on a first transmit chain, sending a second TRN basic sub-sequence on a second transmit chain, and sending a third TRN basic sub-sequence on a third transmit chain; or if a value of A is 4, the transmission format of the TRN subfield is sending a first TRN basic sub-sequence on a first transmit chain, sending a second TRN basic sub-sequence on a second transmit chain, sending a third TRN basic sub-sequence on a third transmit chain, and sending a fourth TRN basic sub-sequence on a fourth transmit chain; or if a value of A is 5, the transmission format of the TRN subfield is separately sending a first TRN basic sub-sequence on a first transmit chain in two time units, separately sending a second TRN basic sub-sequence on a second transmit chain in the two time units, separately sending a third TRN basic sub-sequence on a third transmit chain in the two time units, separately sending a fourth TRN basic sub-sequence on a fourth transmit chain in the two time units, and separately sending a fifth TRN basic sub-sequence on a fifth transmit chain in the two time units; and a mask used by the first TRN basic sub-sequence is [1, 1], a mask used by the second TRN basic sub-sequence is [1, 1], a mask used by the third TRN basic sub-sequence is [1, −1], a mask used by the fourth TRN basic sub-sequence is [1, −1], and a mask used by the fifth TRN basic sub-sequence is [1, 1]; or if a value of A is 6, the transmission format of the TRN subfield is separately sending a first TRN basic sub-sequence on a first transmit chain in two time units, separately sending a second TRN basic sub-sequence on a second transmit chain in the two time units, separately sending a third TRN basic sub-sequence on a third transmit chain in the two time units, separately sending a fourth TRN basic sub-sequence on a fourth transmit chain in the two time units, separately sending a fifth TRN basic sub-sequence on a fifth transmit chain in the two time units, and separately sending a sixth TRN basic sub-sequence on a sixth transmit chain in the two time units; and a mask used by the first TRN basic sub-sequence is [1, 1], a mask used by the second TRN basic sub-sequence is [1, 1], a mask used by the third TRN basic sub-sequence is [1, −1], a mask used by the fourth TRN basic sub-sequence is [1, −1], a mask used by the fifth TRN basic sub-sequence is [1, 1], and a mask used by the sixth TRN basic sub-sequence is [1, 1]; or if a value of A is 7, the transmission format of the TRN subfield is separately sending a first TRN basic sub-sequence on a first transmit chain in two time units, separately sending a second TRN basic sub-sequence on a second transmit chain in the two time units, separately sending a third TRN basic sub-sequence on a third transmit chain in the two time units, separately sending a fourth TRN basic sub-sequence on a fourth transmit chain in the two time units, separately sending a fifth TRN basic sub-sequence on a fifth transmit chain in the two time units, separately sending a sixth TRN basic sub-sequence on a sixth transmit chain in the two time units, and separately sending a seventh TRN basic sub-sequence on a seventh transmit chain in the two time units; and a mask used by the first TRN basic sub-sequence is [1, 1], a mask used by the second TRN basic sub-sequence is [1, 1], a mask used by the third TRN basic sub-sequence is [1, −1], a mask used by the fourth TRN basic sub-sequence is [1, −1], a mask used by the fifth TRN basic sub-sequence is [1, 1], a mask used by the sixth TRN basic sub-sequence is [1, 1], and a mask used by the seventh TRN basic sub-sequence is [1, −1]; or if a value of A is 8, the transmission format of the TRN subfield is separately sending a first TRN basic sub-sequence on a first transmit chain in two time units, separately sending a second TRN basic sub-sequence on a second transmit chain in the two time units, separately sending a third TRN basic sub-sequence on a third transmit chain in the two time units, separately sending a fourth TRN basic sub-sequence on a fourth transmit chain in the two time units, separately sending a fifth TRN basic sub-sequence on a fifth transmit chain in the two time units, separately sending a sixth TRN basic sub-sequence on a sixth transmit chain in the two time units, separately sending a seventh TRN basic sub-sequence on a seventh transmit chain in the two time units, and separately sending an eighth TRN basic sub-sequence on an eighth transmit chain in the two time units; and a mask used by the first TRN basic sub-sequence is [1, 1], a mask used by the second TRN basic sub-sequence is [1, 1], a mask used by the third TRN basic sub-sequence is [1, −1], a mask used by the fourth TRN basic sub-sequence is [1, −1], a mask used by the fifth TRN basic sub-sequence is [1, 1], a mask used by the sixth TRN basic sub-sequence is [1, 1], a mask used by the seventh TRN basic sub-sequence is [1, −1], and a mask used by the eighth TRN basic sub-sequence is [1, −1]. The first transmit chain is a transmit chain whose transmit chain index is 1. The rest may be deduced by analogy. The first TRN basic sub-sequence is $TRN_{basic}^1$, the second TRN basic sub-sequence is $TRN_{basic}^2$, the third TRN basic sub-sequence is $TRN_{basic}^3$, and the fourth TRN basic sub-sequence is $TRN_{basic}^4$. A mask used by a TRN basic sub-sequence may be a mask used by a TRN subfield including the TRN basic sub-sequence. For example, if the value of A is 8, a TRN subfield including the first TRN basic sub-sequence is $[TRN_{basic}^1, TRN_{basic}^1]$, so that the mask used by the first TRN basic sub-sequence may be a mask used by $[TRN_{basic}^1, TRN_{basic}^1]$. It should be noted that, if the type of the antenna is a dual-polarized antenna, only a case in which A is an even number is taken in Table 3.

It can be learned that A radio frequency chains are separately allocated to two aggregated channels.

It can be learned from Table 3 that, the transmission format of the TRN subfield may still be determined by using the total quantity of transmit chains; however, a relationship between the transmitted TRN subfield and a sequence mask is related to a quantity of transmit chains allocated to each channel. A length of the sequence sent on each transmit chain is shortened, so that transmission efficiency can also be improved.

A time unit is a time occupied by a TRN basic sub-sequence. Other definitions are the same as those in Table 1. An $i^{th}$ basic sub-sequence $TRN_{basic}^i = [Ga_N^i, -Gb_N^i, Ga_N^i, Gb_N^i, Ga_N^i, -Gb_N^i]$, where Ga and Gb are Golay sequences. For the Golay sequence, refer to definitions in the protocol.

Nj indicates a length of a Golay sequence of the $j^{th}$ channel, and Nj=TRN_BL×NCBj, where TRN_BL=128, 64, or 256. A default length of TRN_BL is 128, or a length of TRN_BL may be notified as 64 or 256 by additionally using signaling. NCBj indicates a quantity of consecutive channels used for transmitting the TRN subfield on the $j^{th}$ aggregated channel participating in the CA, and bandwidths of all the consecutive channels are 2.16 GHz, where 1≤NCBj≤4 and j=1 or 2.

In this method, the transmit chain sequence numbers are sorted based on the total quantity of transmit chains, to be specific, radio frequency chain numbers on primary and secondary channels are not repeated. Therefore, the transmit end does not need to limit allocation of former Ntx/2 radio frequency chains to the primary channel, and allocation of latter Ntx/2 radio frequency chains to the secondary channel, thereby providing more flexibility for multi-user beam training.

In the solutions described above, a length of a transmitted TRN subfield is shortened by reducing TRN basic sub-sequences in a transmitted sequence. A technical solution is further provided below, so that a length of a transmitted TRN subfield can be shortened by shortening a length of a TRN basic sub-sequence.

When the channel transmission mode is the CA mode, the first device may determine that a length of a Golay sequence included in the TRN subfield is TRN_BL×NCBj/2, where TRN_BL is length information of the Golay sequence that is indicated in a header of the BRP packet. For example, a default length of the Golay sequence is 128, or the length of the Golay sequence may be 64 or 256; NCBj is a quantity of consecutive channels used for transmitting the TRN subfield on the $j^{th}$ channel participating in the CA, and the consecutive channels may be channels having a 2.16 GHz bandwidth; and j=1, 2. To be specific, in this solution, the length of the Golay sequence is directly shortened, so that the length of the Golay sequence is only half of an original length, thereby shortening the length of the TRN basic sub-sequence, and shortening a length of a TRN sub-sequence. Therefore, transmission efficiency is improved. In this case, the transmission format of the TRN subfield may be determined by using the total quantity of transmit chains, and the mapping relationship between the transmission format of the TRN subfield and the total quantity of transmit chains may still be determined by using Table 1 described above. It can be learned that, even if the total quantity of transmit chains is greater than or equal to 5, TRN basic sub-sequences included in a TRN subfield that needs to be sent are $TRN_{basic}^1$ to $TRN_{basic}^8$. However, a length of each of the TRN basic sub-sequences is shortened. Therefore, a length of the entire TRN subfield is also correspondingly shortened, thereby improving the transmission efficiency.

An advantage of the method is that descriptions about distinguishing between the CA mode and the CB mode can be reduced, and only the length of the Golay sequence is correspondingly scaled.

The foregoing describes how to reduce a length of a transmitted sequence, to improve the transmission efficiency. Impact of a polarized antenna on a TRN field format and a beam training procedure is resolved by further using a technical solution provided in an embodiment of this application below.

In the IEEE 802.11ad, a BRP packet is sent by using a single antenna. To be specific, the BRP packet is transmitted by using an optimal antenna obtained through sector level sweep (SLS) training, to be specific, a transmit antenna of a TRN field and a transmit antenna of a preamble and a data field in the BRP packet are the same. Due to this limitation, it is disadvantageous to perform beam training or beam tracking by flexibly using the BRP packet when there are a plurality of transmit antennas.

Therefore, a BRP TXSS procedure is introduced into the IEEE 802.1 lay. In this procedure, when transmitting a BRP packet, a transmit end is allowed to send a preamble and a data field by using an optimal antenna obtained through SLS training, and send a TRN field by using another antenna. Therefore, in this TRN configuration, there is a TRN-unit configured to switch between transmit chains. However, currently, this procedure is limited to being used for only switching between single transmit chains. To be specific, the process is limited to: When a BRP packet is sent on a single transmit chain, if a data field of the BRP packet is sent on a transmit chain 1, a TRN field of the BRP packet may be sent on another transmit chain. In this method, a problem that a BRP packet is used for a plurality of transmit chains in the IEEE 802.11 ad is partially overcome. However, for a dual-polarized antenna, there is still a defect that beam training performed by multiplexing a BRP TXSS single-input single-output (SISO) procedure by the dual-polarized antenna is limited. Currently, a BRP TXSS SISO phase particularly is a case of a single transmit chain. However, the dual-polarized antenna means that two polarization directions are integrated into one antenna, and each dual-polarized antenna may be connected to two radio frequency chains. In a diversity mode, a single stream is used. In a multiplexing mode, a dual stream is used. A dual-polarized antenna facilitates co-located deployment. Therefore, the dual-polarized antenna is a relatively common antenna configuration in an area-limited device. In addition to an area advantage, the dual-polarized antenna may further be flexibly configured to be in a spatial multiplexing mode to obtain a larger throughput, or configured to be in a diversity mode to obtain more reliable transmission. A dual-polarized antenna usually integrates antennas in two polarization directions, such as +45° and −45° polarization directions or a horizontal polarization direction and a vertical polarization direction. A transmission polarization direction of the dual-polarized antenna may be changed in a propagation process, and if a receive end performs receiving in only one polarization direction, a case in which the receiving cannot be performed may occur. Therefore, when the transmit end and the receive end do not have a beam training result, in an SLS phase, a co-located dual-polarized antenna may be used for one-stream transmission. Similarly, for the receive end, two signals received by the co-located dual-polarized antenna are combined into one stream for reception, so that an optimal dual-polarized directional antenna is obtained, and a basic chain between the receiver end and the transceiver end is set up. To be specific, in the SLS phase, the dual-polarized antenna may be set to be in a diversity mode, to obtain reliable transmission. In this way, in a BRP TXSS phase, an optimal antenna used for the BRP packet is actually a result of combined transmission in a dual polarization direction, and the receive end is also the result of the combined transmission in the dual polarization direction. Therefore, a quantity of data field transmission radio frequency chains is 2, a quantity of streams of the data field is 1. However, based on a current procedure, a BRP packet for which a quantity of data transmission radio frequency antennas is 2 cannot be used, and training of a plurality of transmit antennas is switched to another dual-polarized antenna. Therefore, an existing BRP TXSS procedure cannot be multiplexed, thereby improving beam training efficiency.

The quantity of transport streams is a quantity of independent spatial streams, to be specific, data amount of different transmitted data.

Figure 3:
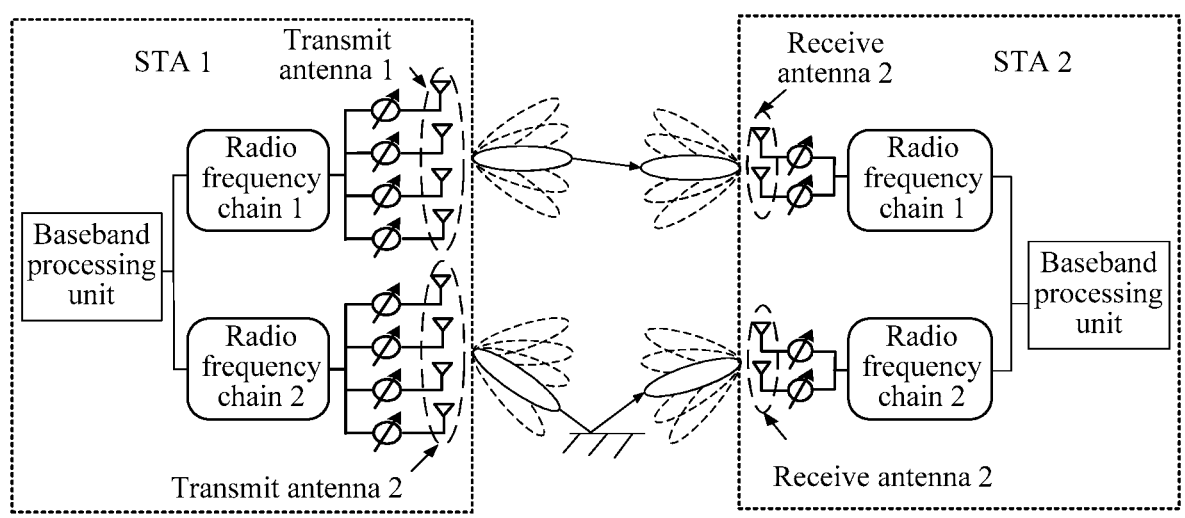
FIG. 3 is a schematic structural diagram of a transceiver machine according to an embodiment of this application.

For ease of understanding, a structure of a transceiver machine of a device is described first, to help understand a relationship between a radio frequency chain and an antenna. FIG. 3 shows multiple-input multiple-output (MIMO) having two transmit antennas and two receive antennas that is formed by using a STA 1 as a transmit device and a STA 2 as a receive device in analog beam directions indicated by using solid lines. Each of the STA 1 and the STA 2 may include a baseband processing unit (baseband, BB), two radio frequency chains, and two DMG antennas. If two antennas in FIG. 3 are not co-located, the two antennas are single-polarized antennas. In this case, an antenna 1 and an antenna 2 are two antennas. However, if the two antennas are co-located, the two antennas are a dual-polarized antenna. In this case, the antenna 1 and the antenna 2 may be considered as one antenna, and the antenna has two polarization directions. A transmit antenna 1 in the STA 1 and a receive antenna 1 in the STA 2 form the antenna 1, and a transmit antenna 2 in the STA 1 and a receive antenna 2 in the STA 2 form the antenna 2. In FIG. 3, an example in which a DMG antenna is implemented by using a phased antenna array is used. In an actual application, the antenna may be alternatively implemented in another manner. The antenna 1 in the STA 1 may form a beam direction, and the antenna 2 in the STA 2 may form another beam direction. In FIG. 3, each DMG antenna in the STA 1 includes four antenna array elements, and each DMG antenna in the STA 2 includes two antenna array elements. In an actual application, quantities of array elements used in DMG antennas in the STA 1 and the STA 2 are not necessarily the same, and quantities of array elements in different antennas in a same STA may be the same or may be different.

It is mentioned in the foregoing that in the IEEE 802.11ay D0.5, there is a limitation that the format of the TRN subfield is determined by using the total quantity of transmit chains for the TRN, and the quantity of transmit chains for the TRN is the same as a quantity of transmit chains for a PPDU. This also introduces too many limitations for beam tracking. Beam tracking is mainly to prevent beam measurement on a propagation channel in another direction that is attempted after relatively good transmit and receive beam configurations have been obtained, because receive and transmit devices are moved or rotated, or a direct path between the receive and transmit devices is blocked. Similar to the SLS phase, a co-located dual-polarized antenna may transmit data by using two different streams, to obtain a relatively large throughput. To be specific, the dual-polarized antenna is in a spatial multiplexing mode. However, if the co-located dual-polarized antenna transmits a TRN subfield by using two different streams for beam training, after the propagation channel is changed, the receive end possibly cannot receive the TRN and detect an appropriate backup beam configuration. Therefore, the dual-polarized antenna should be allowed to perform sending in the diversity mode, and a receive dual-polarized antenna performs receiving in the diversity mode. It can be ensured that after the channel is changed, reception can be correctly performed in at least one of the two polarization directions.

In view of this, in this embodiment of this application, the quantity of transmit chains used for transmitting the TRN field may be decoupled from a quantity of transmit chains used for transmitting the data field, so that independence between quantities of transmit chains in the two processes can be implemented to some extent, thereby implementing more flexible transmission.

In this embodiment of this application, when the type of the antenna used for transmitting the TRN subfield is the dual polarization mode, the quantity of transmit chains used for transmitting the TRN subfield is equal to a quantity of transport streams of the TRN subfield, or the quantity of transmit chains used for transmitting the TRN subfield is equal to a quantity of transport streams of the TRN subfield× 2.

Specifically, there may be different manners for making the quantity of transport streams of the TRN subfield be half of the quantity of transmit chains used for transmitting the TRN subfield.

For example, if a BRP TXSS MIMO or BRP TXSS SISO procedure is multiplexed, in MIMO or SISO sending, switching from one polarization antenna to another polarization antenna needs to be allowed. Therefore, at least one of BRP packets sent by a transmit device to a receive device carries a TRN unit configured to perform beam switching. One TRN unit includes P+M+1 TRN subfields, where P and M are indicated by using an EDMG Header-A. To be specific, a BRP packet allowing two transmit chains is required, and it is further allowed that an antenna used for sending a TRN field suffixed to the BRP packet is different from an antenna used for sending a BRP frame used for setting up (setup) an entire BRP TXSS process.

Due to existence of the dual-polarized antenna, in an SLS case, polarized antennas in a same antenna planar array may be processed as a same antenna, so that two polarized antennas may send a same signal, and the receive end combines signals received from the two polarized antennas. For example, signals transmitted by two co-located dual-polarized antennas may be considered as one stream of signals. To be specific, a dual-polarized antenna used for transmitting two streams of data in data transmissions of a same planar array may be used for one-stream transmission. Therefore, assuming that the data field of the BRP packet is transmitted by using eight streams, even if the quantity of transmit chains used for transmitting the TRN field is the same as the quantity of transmit chains used for transmitting the data field, the quantity of transport streams of the TRN subfield may be half of the quantity of transmit chains used for transmitting the TRN subfield, to be specific, the quantity of transport streams of the TRN subfield is 4. To be specific, a same dual-polarized antenna sends a same TRN subfield, and a quantity of transport streams is half of a quantity of transmit chains.

Alternatively, the quantity of transport streams of the TRN subfield may be made, by switching between statuses of the transmit chains, be half of the quantity of transmit chains used for transmitting the TRN subfield. For example, the statuses of the transmit chains may be switched between transmission of the data field and transmission of the TRN field. For example, the data field is transmitted first, and the statuses of the transmit chains may be switched after the data field is transmitted. Statuses of half of the transmit chains are switched from an on state to an off state, so that these transmit chains do not perform transmission any more. Therefore, only remaining half of the transmit chains continue to transmit the TRN field. In this way, the quantity of transmit chains used for transmitting the TRN field is completely decoupled from the quantity of transmit chains used for transmitting the data field. This embodiment of this application does not limit a specific implementation. In this embodiment of this application, the transmit chains used for transmitting the TRN subfield and the transmit chains used for transmitting the TRN field may be considered to be the same.

The BRP TXSS procedure in this embodiment of this application is described below.

Figure 4:
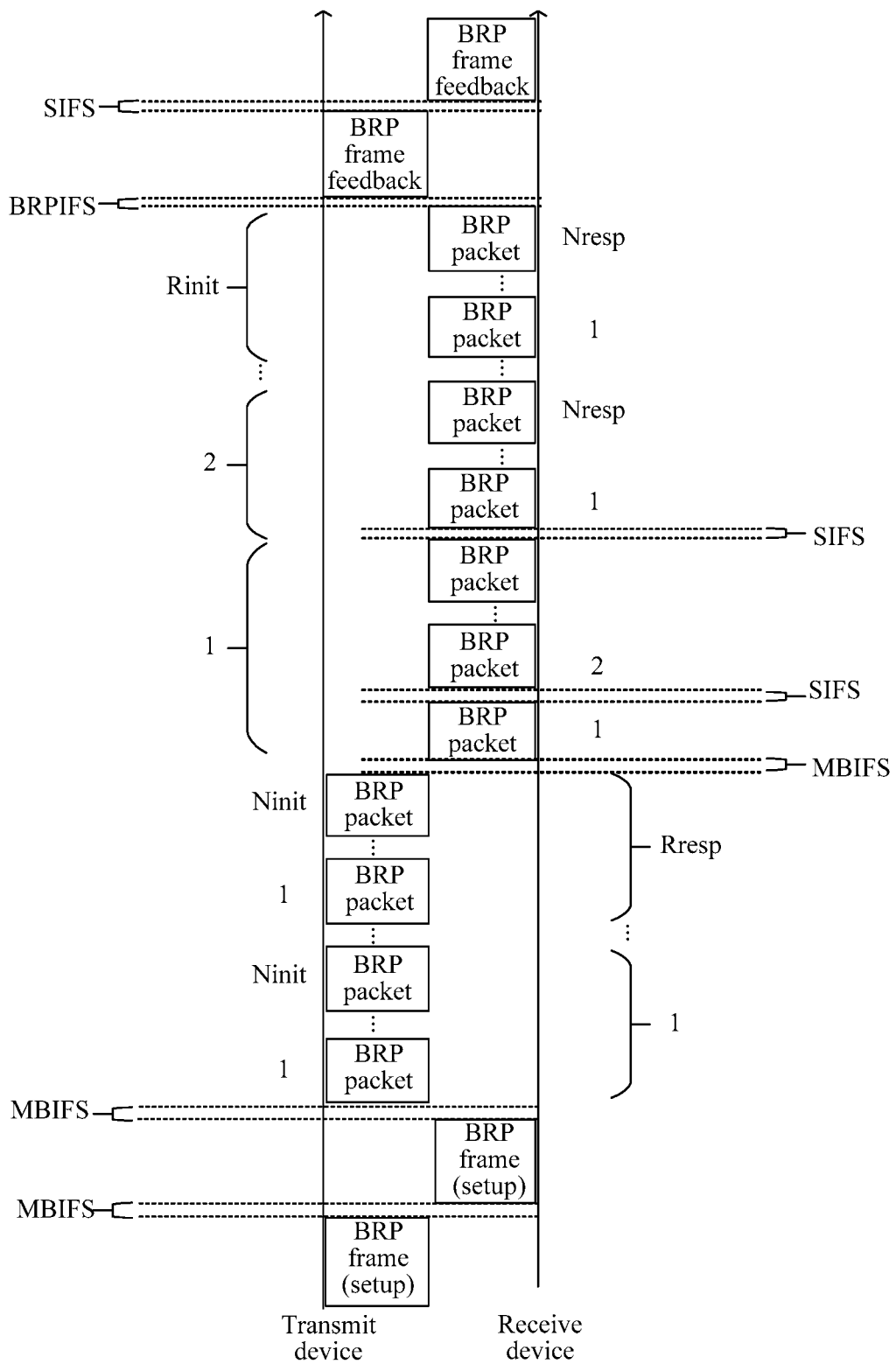
FIG. 4 is a schematic diagram of a BRP TXSS process according to an embodiment of this application.

Referring to FIG. 4, it may be understood that a BRP TXSS procedure defined in the current protocol includes several phases: (1) First phase: This phase is a phase in which a receive device and a transmit device negotiate a parameter by using a BRP frame used for setting up (setup) the entire BRP TXSS process. In this phase, the receive device and the transmit device may negotiate parameters such as Ninit, Rinit, Nresp, and Rresp. (2) Second phase: The transmit device (initiator) sends a BRP packet to the receive device (responder), and a quantity of BRP packets sent by the transmit device is Ninit*Rresp, where Ninit may be understood as a quantity of BRP packets sent by the transmit device each time, and Rresp may be understood as a quantity of repeated transmissions performed by the transmit device. It can be learned that in the second phase in FIG. 4, a quantity of BRP packets included in braces indicated by using a digit 1 at the bottom of the figure is Ninit, and a total quantity of repeated transmissions is Rresp. (3) Third phase: This phase is an optional phase. To be specific, the receive device sends a BRP packet to the transmit device, and a quantity of BRP packets sent by the receive device is Rinit*Nresp, where Rinit may be understood as a quantity of BRP packets sent by the receive device each time, and Nresp may be understood as a quantity of repeated transmissions performed the receive device. It can be learned that in the third phase in FIG. 3, quantities of BRP packets included in braces indicated by using digits 1 and 2 at the top of the figure are Nresp, and a total quantity of repeated transmissions is Rinit. (4) Fourth phase: The fourth phase may also be understood as a feedback phase. To be specific, the receive device sends a BRP frame feedback to the transmit device, to complete a handshake. In addition, if the third phase is performed, the transmit device also sends the BRP frame feedback to the receive device.

In this embodiment of this application, a type of an antenna, to be specific, whether the antenna is a single-polarized antenna or a dual-polarized antenna, may be added to the BRP frame used for setting up the entire BRP TXSS process that is sent by the transmit device. In addition, antenna switching information may further be added to a header of the BRP packet sent by the transmit device. To be specific, if there is a TRN unit configured to perform antenna switching, the antenna switching information may be added to the header of the BRP packet that carries the TRN unit that is sent by the transmit device, so that the receive device may learn of the type of the antenna, and learn of whether the TRN unit configured to perform antenna switching exists. The TRN field may include a plurality of TRN units, and each TRN unit includes P+M+1 TRN subfields, where P and M are indicated by using an EDMG Header-A.

An interframe space of the BRP frame used for setting up the entire BRP TXSS process is a medium beamforming interframe space (MBIFS), and an interframe space between the second phase and the third phase is also the MBIFS. It is stipulated in the protocol that a length of the MBIFS is 9 μs. Interframe spaces in the second phase and the third phase are short interframe spaces (short Interframe Spacing, SIFS). It is stipulated in the protocol that a length of the SIFS is 3 μs. An interframe space between the feedback phase and the second phase and/or the third phase is a beam refinement protocol packet interframe spacing (BRPIS). It is stipulated in the protocol that a length of the BRPIS is 40 μs.

In this embodiment of this application, if the quantity of transmit chains used for transmitting the TRN subfield is equal to the quantity of transport streams of the TRN subfield, the transmission format of the TRN subfield may be determined by using the total quantity of transmit chains, or may be determined by using the quantity of transmit chains used for transmitting the TRN subfield on each channel.

For example, when the quantity of transmit chains used for transmitting the TRN subfield is equal to the quantity of transport streams of the TRN subfield, a mapping relationship between the transmission format of the TRN subfield and the total quantity of transmit chains may still be determined by using the foregoing Table 1. In this case, A in Table 1 is an even number. Alternatively, when the quantity of transmit chains used for transmitting the TRN subfield is equal to the quantity of transport streams of the TRN subfield, a mapping relationship between the transmission format of the TRN subfield and the total quantity of transmit chains may still be determined by using the foregoing Table 2. Alternatively, when the quantity of transmit chains used for transmitting the TRN subfield is equal to the quantity of transport streams of the TRN subfield, a mapping relationship between the transmission format of the TRN subfield and the total quantity of transmit chains may still be determined by using the foregoing Table 3. Certainly, in this case, A in Table 3 is an even number. For descriptions of Table 2 and Table 3, refer to the foregoing descriptions, and details are not described herein again.

Similarly, for the CA mode, if the quantity of transmit chains used for transmitting the TRN subfield is equal to the quantity of transport streams of the TRN subfield×2, the transmission format of the TRN subfield may be determined by using the quantity of transmit chains used for transmitting the TRN subfield on each channel or by using the total quantity of transmit chains.

Two radio frequency chains in a same dual-polarized antenna use a same transmission format of the TRN subfield, to be specific, the two radio frequency chains in the same dual-polarized antenna transmits TRN subfields by using the same transmission format, and the TRN subfields transmitted on the two radio frequency chains in the same dual-polarized antenna are the same. The radio frequency chain herein may be a transmit chain.

For example, when the quantity of transmit chains used for transmitting the TRN subfield is equal to the quantity of transport streams of the TRN subfield×2, a mapping relationship between the transmission format of the TRN subfield and the quantity of transmit chains on each channel may be determined by using the following Table 4:

TABLE 4

| Total quantity of transmit chains on each channel | Transmit chain index | TRN subfield definition |
| --- | --- | --- |
| 2 | 1 | $TRN_{basic}^{1}$ |
|   | 2 | $TRN_{basic}^{1}$ |
| 3, 4 | 1 | $TRN_{basic}^{1}$ |
|   | 2 | $TRN_{basic}^{1}$ |
|   | 3 | $TRN_{basic}^{2}$ |
|   | 4 | $TRN_{basic}^{2}$ |

It can be learned based on Table 4 that, if a value of Bj is 2, the transmission format of the TRN subfield is sending a first TRN basic sub-sequence on a first transmit chain, and sending the first TRN basic sub-sequence on a second transmit chain; or if a value of Bj is 3, the transmission format of the TRN subfield is sending a first TRN basic sub-sequence on a first transmit chain, sending the first TRN basic sub-sequence on a second transmit chain, and sending a second TRN basic sub-sequence on a third transmit chain; or if a value of Bj is 4, the transmission format of the TRN subfield is sending a first TRN basic sub-sequence on a first transmit chain, sending the first TRN basic sub-sequence on a second transmit chain, sending a second TRN basic sub-sequence on a third transmit chain, and sending the second TRN basic sub-sequence on a fourth transmit chain. The first TRN basic sub-sequence is $TRN_{basic}^1$, and the second TRN basic sub-sequence is $TRN_{basic}^2$. It can be learned that in this case, A is an even number. The transmit chain index is a number of a transmit chain. It may be understood that, different from the CB mode, the transmit chain index is independently numbered on each channel, so that transmit chain sequence numbers on a primary channel and a secondary channel are repeated.

Alternatively, when the quantity of transmit chains used for transmitting the TRN subfield is equal to the quantity of transport streams of the TRN subfield×2, a mapping relationship between a transmission format of a TRN subfield and a total quantity of transmit chains may be determined by using the following Table 5:

TABLE 5

| Total quantity of transmit chains | Transmit chain number | TRN subfield definition |
|---|---|---|
| 2, 4 | 1 | $TRN_{basic}^1$ |
|  | 2 | $TRN_{basic}^1$ |
|  | 3 | $TRN_{basic}^2$ |
|  | 4 | $TRN_{basic}^2$ |
| 6, 8 | 1 | $[TRN_{basic}^1, TRN_{basic}^1]$ |
|  | 2 | $[TRN_{basic}^1, TRN_{basic}^1]$ |
|  | 3 | $[TRN_{basic}^2, TRN_{basic}^2]$ |
|  | 4 | $[TRN_{basic}^2, TRN_{basic}^2]$ |
|  | 5 | $[TRN_{basic}^3, -TRN_{basic}^3]$ |
|  | 6 | $[TRN_{basic}^3, -TRN_{basic}^3]$ |
|  | 7 | $[TRN_{basic}^4, -TRN_{basic}^4]$ |
|  | 8 | $[TRN_{basic}^4, -TRN_{basic}^4]$ |

It can be learned based on Table 5 that, if a value of A is 2, the transmission format of the TRN subfield is sending a first TRN basic sub-sequence on a first transmit chain, and sending the first TRN basic sub-sequence on a second transmit chain; or if a value of A is 4, the transmission format of the TRN subfield is sending a first TRN basic sub-sequence on a first transmit chain, sending the first TRN basic sub-sequence on a second transmit chain, sending a second TRN basic sub-sequence on a third transmit chain, and sending the second TRN basic sub-sequence on a fourth transmit chain; or if a value of A is 6, the transmission format of the TRN subfield is separately sending a first TRN basic sub-sequence on a first transmit chain in two time units, separately sending the first TRN basic sub-sequence on a second transmit chain in the two time units, separately sending a second TRN basic sub-sequence on a third transmit chain in the two time units, separately sending the second TRN basic sub-sequence on a fourth transmit chain in the two time units, separately sending a third TRN basic sub-sequence on a fifth transmit chain in the two time units, and separately sending the third TRN basic sub-sequence on a sixth transmit chain in the two time units; and a mask used by the first TRN basic sub-sequence is [1, 1], a mask used by the second TRN basic sub-sequence is [1, 1], and a mask used by the third TRN basic sub-sequence is [1, −1]; or if a value of A is 8, the transmission format of the TRN subfield is separately sending a first TRN basic sub-sequence on a first transmit chain in two time units, separately sending the first TRN basic sub-sequence on a second transmit chain in the two time units, separately sending a second TRN basic sub-sequence on a third transmit chain in the two time units, separately sending the second TRN basic sub-sequence on a fourth transmit chain in the two time units, separately sending a third TRN basic sub-sequence on a fifth transmit chain in the two time units, separately sending the third TRN basic sub-sequence on a sixth transmit chain in the two time units, separately sending a fourth TRN basic sub-sequence on a seventh transmit chain in the two time units, and separately sending the fourth TRN basic sub-sequence on an eighth transmit chain in the two time units; and a mask used by the first TRN basic sub-sequence is [1, 1], a mask used by the second TRN basic sub-sequence is [1, 1], a mask used by the third TRN basic sub-sequence is [1, −1], and a mask used by the fourth TRN basic sub-sequence is [1, −1]. The first TRN basic sub-sequence is $TRN_{basic}^1$, the second TRN basic sub-sequence is $TRN_{basic}^2$, the third TRN basic sub-sequence is $TRN_{basic}^3$, and the fourth TRN basic sub-sequence is $TRN_{basic}^4$. It can be learned that in this case, A is an even number.

The foregoing describes the solutions in the CA mode. If the channel transmission mode is the CB mode, the type of the antenna is a dual-polarized antenna, and the quantity of transmit chains used for transmitting the TRN subfield is equal to the quantity of transport streams of the TRN subfield×2, two radio frequency chains in the same dual-polarized antenna use a same transmission format of the TRN subfield, to be specific, the two radio frequency chains in the same dual-polarized antenna transmits TRN subfields by using the same transmission format, and the TRN subfields transmitted on the two radio frequency chains in the same dual-polarized antenna are the same. The radio frequency chain herein may be a transmit chain.

The transmission format of the TRN subfield may also be determined based on the total quantity of transmit chains. For a mapping relationship between a transmission format of a TRN subfield and a total quantity of transmit chains, refer to Table 6:

TABLE 6

| Total quantity of transmit chains | Transmit chain number | TRN subfield definition |
|---|---|---|
| 2 | 1 | $TRN_{basic}^1$ |
|  | 2 | $TRN_{basic}^1$ |
| 4 | 1 | $[TRN_{basic}^1, TRN_{basic}^1]$ |
|  | 2 | $[TRN_{basic}^1, TRN_{basic}^1]$ |
|  | 3 | $[TRN_{basic}^2, -TRN_{basic}^4]$ |
|  | 4 | $[TRN_{basic}^2, -TRN_{basic}^2]$ |
| 6, 8 | 1 | $[TRN_{basic}^1, TRN_{basic}^1, TRN_{basic}^1, TRN_{basic}^1]$ |
|  | 2 | $[TRN_{basic}^1, TRN_{basic}^1, TRN_{basic}^1, TRN_{basic}^1]$ |

TABLE 6-continued

| Total quantity of transmit chains | Transmit chain number | TRN subfield definition |
|---|---|---|
| | 3 | [$TRN_{basic}^2$, $TRN_{basic}^2$, $TRN_{basic}^2$, $TRN_{basic}^2$] |
| | 4 | [$TRN_{basic}^2$, $TRN_{basic}^2$, $TRN_{basic}^2$, $TRN_{basic}^2$] |
| | 5 | [$TRN_{basic}^3$, $-TRN_{basic}^3$, $TRN_{basic}^3$, $-TRN_{basic}^3$] |
| | 6 | [$TRN_{basic}^3$, $-TRN_{basic}^3$, $TRN_{basic}^3$, $-TRN_{basic}^3$] |
| | 7 | [$TRN_{basic}^4$, $-TRN_{basic}^4$, $TRN_{basic}^4$, $-TRN_{basic}^4$] |
| | 8 | [$TRN_{basic}^4$, $-TRN_{basic}^4$, $TRN_{basic}^4$, $-TRN_{basic}^4$] |

It can be learned based on Table 6 that, if a value of A is 2, the transmission format of the TRN subfield is sending a first TRN basic sub-sequence on a first transmit chain, and sending the first TRN basic sub-sequence on a second transmit chain; or if a value of A is 4, the transmission format of the TRN subfield is separately sending a first TRN basic sub-sequence on a first transmit chain in two time units, separately sending the first TRN basic sub-sequence on a second transmit chain in the two time units, separately sending a second TRN basic sub-sequence on a third transmit chain in the two time units, and separately sending the second TRN basic sub-sequence on a fourth transmit chain in the two time units; and a mask used by the first TRN basic sub-sequence is [1, 1], a mask used by the second TRN basic sub-sequence is [1, 1], a mask used by the third TRN basic sub-sequence is [1, −1], and a mask used by the fourth TRN basic sub-sequence is [1, −1]; or if a value of A is 6, the transmission format of the TRN subfield is separately sending a first TRN basic sub-sequence on a first transmit chain in four time units, separately sending the first TRN basic sub-sequence on a second transmit chain in the four time units, separately sending a second TRN basic sub-sequence on a third transmit chain in the four time units, separately sending the second TRN basic sub-sequence on a fourth transmit chain in the four time units, separately sending a third TRN basic sub-sequence on a fifth transmit chain in the four time units, and separately sending the third TRN basic sub-sequence on a sixth transmit chain in the four time units; a mask used by the first TRN basic sub-sequence is [1, 1, 1, 1], a mask used by the second TRN basic sub-sequence is [1, 1, 1, 1], and a mask used by the third TRN subfield is [1, −1, 1, −1]; or if a value of A is 8, the transmission format of the TRN subfield is separately sending a first TRN basic sub-sequence on a first transmit chain in four time units, separately sending the first TRN basic sub-sequence on a second transmit chain in the four time units, separately sending a second TRN basic sub-sequence on a third transmit chain in the four time units, separately sending the second TRN basic sub-sequence on a fourth transmit chain in the four time units, separately sending a third TRN basic sub-sequence on a fifth transmit chain in the four time units, separately sending the third TRN basic sub-sequence on a sixth transmit chain in the four time units, separately sending a fourth TRN basic sub-sequence on a seventh transmit chain in the four time units, and separately sending the fourth TRN basic sub-sequence on an eighth transmit chain in the four time units; and a mask used by the first TRN basic sub-sequence is [1, 1, 1, 1], a mask used by the second TRN basic sub-sequence is [1, 1, 1, 1], a mask used by the third TRN basic sub-sequence is [1, −1, 1, −1], and a mask used by the fourth TRN basic sub-sequence is [1, −1, 1, −1]. The first TRN basic sub-sequence is $TRN_{basic}^1$, the second TRN basic sub-sequence is $TRN_{basic}^2$, the third TRN basic sub-sequence is $TRN_{basic}^3$, and the fourth TRN basic sub-sequence is $TRN_{basic}^4$. It can be learned that in this case, A is an even number.

However, if the channel transmission mode is the CB mode, the type of the antenna is a dual-polarized antenna, and the quantity of transmit chains used for transmitting the TRN subfield is equal to the quantity of transport streams of the TRN subfield, the transmission format of the TRN subfield may also be determined based on the total quantity of transmit chains. For a mapping relationship between a transmission format of a TRN subfield and a total quantity of transmit chains, continue to refer to Table 1, and A is an even number. Details are not described again.

S22: The first device sends a beam refinement protocol packet to a second device on a transmit chain based on the transmission format, so that the second device receives the beam refinement protocol packet on a corresponding receive chain from the transmit chain of the first device. The beam refinement protocol packet includes a data field and a TRN field, and the TRN field includes a plurality of TRN subfields.

After determining the transmission format of the TRN subfield, the first device may send the BRP packet to the second device on the transmit chain based on the transmission format. The TRN subfield in the BRP packet uses the determined transmission format.

In addition, after determining the transmission format of the TRN subfield, the first device may further send notification signaling to the second device. The notification signaling is used to indicate the transmission format of the TRN subfield. After receiving the notification signaling, the second device may receive, based on the transmission format, the BRP packet sent by the first device on the transmit chain.

The notification signaling may be implemented by using MAC layer signaling or physical layer signaling. The MAC layer signaling is, for example, some elements such as a beam training request element (EDMG/DMG Beam Refinement element) in the BRP frame. The physical layer signaling is, for example, a header of the BRP packet, to be specific, the first device may indicate the transmission format of the TRN subfield in the BRP packet by directly using the header of the sent BRP packet. Alternatively, the notification signaling may be alternatively implemented in another manner. For example, the first device may send dedicated notification signaling to the second device without adding the notification signaling to the BRP packet.

Alternatively, the second device may initiate a request to the first device, to request the first device to send a BRP packet having a TRN subfield in a transmission format, so that after receiving the request, the first device may send the BRP packet having the TRN subfield in the transmission format to the second device.

In addition, the first device and the second device may further obtain a parameter such as an antenna configuration capability of each other through capability interaction, to match a transmission format of a TRN subfield that can be received by each other.

According to the technical solutions provided in the embodiments of this application, transmission efficiency can be effectively improved. The embodiments of this application provide the solutions in the CA mode, and also provide the solutions in the CB mode, so that the embodiments of this application can relatively fully cover a plurality of application scenarios and are relatively flexible.

An apparatus provided in the embodiments of this application is described below with reference to the accompanying drawings.

Figure 5:
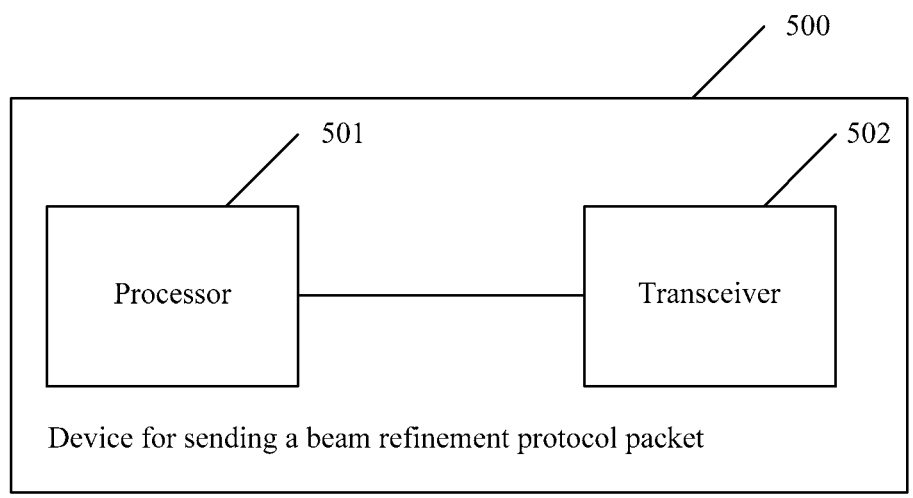
FIG. 5 is a schematic structural diagram of a device for sending a beam refinement protocol packet according to an embodiment of this application.

FIG. 5 is a schematic structural diagram of a device 500 for sending a beam refinement protocol packet. The device 500 for sending a beam refinement protocol packet may implement a function of the first device in the foregoing descriptions. The device 500 for sending a beam refinement protocol packet may be the first device described above, or may be a chip disposed in the first device in the foregoing descriptions. The device 500 for sending a beam refinement protocol packet may include a processor 501 and a transceiver 502. The processor 501 may be configured to perform S21 in the embodiment shown in FIG. 2, and/or configured to support another process of the technology described in this specification. The transceiver 502 may be configured to perform S22 in the embodiment shown in FIG. 2, and/or configured to support another process of the technology described in this specification.

For example, the processor 501 is configured to determine a transmission format of a TRN subfield based on first information. The first information includes at least one of information indicating a quantity of transmit chains used for transmitting the TRN subfield on each channel, information indicating a type of an antenna used for transmitting the TRN subfield, and information indicating a channel transmission mode; and the channel transmission mode is a channel bonding mode or a channel aggregation mode, and the type of the antenna is a single polarization mode or a dual polarization mode. The transceiver 502 is configured to send a beam refinement protocol packet to a second device on a transmit chain based on the transmission format. The beam refinement protocol packet includes a data field and a TRN field, and the TRN field includes a plurality of TRN subfields.

For all related content of the steps in the foregoing method embodiments, refer to function descriptions of corresponding functional modules, and details are not described herein again.

Figure 6:
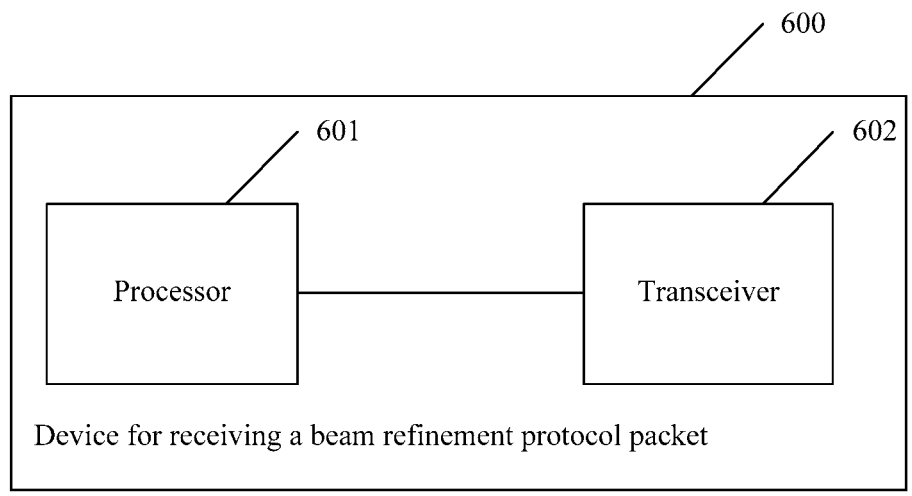
FIG. 6 is a schematic structural diagram of a device for receiving a beam refinement protocol packet according to an embodiment of this application.

FIG. 6 is a schematic structural diagram of a device 600 for receiving a beam refinement protocol packet. The device 600 for receiving a beam refinement protocol packet may implement a function of the first device in the foregoing descriptions. The device 600 for receiving a beam refinement protocol packet may be the second device described above, or may be a chip disposed in the second device described above. The device 600 for receiving a beam refinement protocol packet may include a processor 601 and a transceiver 602. The processor 601 may be configured to perform S22 in the embodiment shown in FIG. 2, and/or configured to support another process of the technology described in this specification. The transceiver 602 may be configured to perform S22 in the embodiment shown in FIG. 2, and/or configured to support another process of the technology described in this specification.

For example, the transceiver 602 is configured to receive notification signaling sent by a first device. The processor 601 is configured to determine that the notification signaling is used to indicate a transmission format of a beam training TRN subfield in the beam refinement protocol packet sent by the first device. The transmission format is determined based on first information, and the first information includes at least one of information indicating a quantity of transmit chains used for transmitting the TRN subfield on each channel, information indicating a type of an antenna used for transmitting the TRN subfield, and information indicating a channel transmission mode; and the channel transmission mode is a channel bonding mode or a channel aggregation mode, and the type of the antenna is a single polarization mode or a dual polarization mode. The transceiver 602 is further configured to receive the beam refinement protocol packet from a transmit chain of the first device based on the transmission format. The beam refinement protocol packet includes a data field and a TRN field, and the TRN field includes a plurality of TRN subfields.

For all related content of the steps in the foregoing method embodiments, refer to function descriptions of corresponding functional modules, and details are not described herein again.

In the embodiments of this application, the device 500 for sending a beam refinement protocol packet or the device 600 for receiving a beam refinement protocol packet is represented in a form of dividing the functional modules based on the functions, or may be represented in a form of integrating the functional modules. The "module" herein may be an application-specific integrated circuit (ASIC), a processor and a memory for executing one or more software or firmware programs, an integrated logic circuit, and/or another component that can provide the foregoing function.

Figure 7:
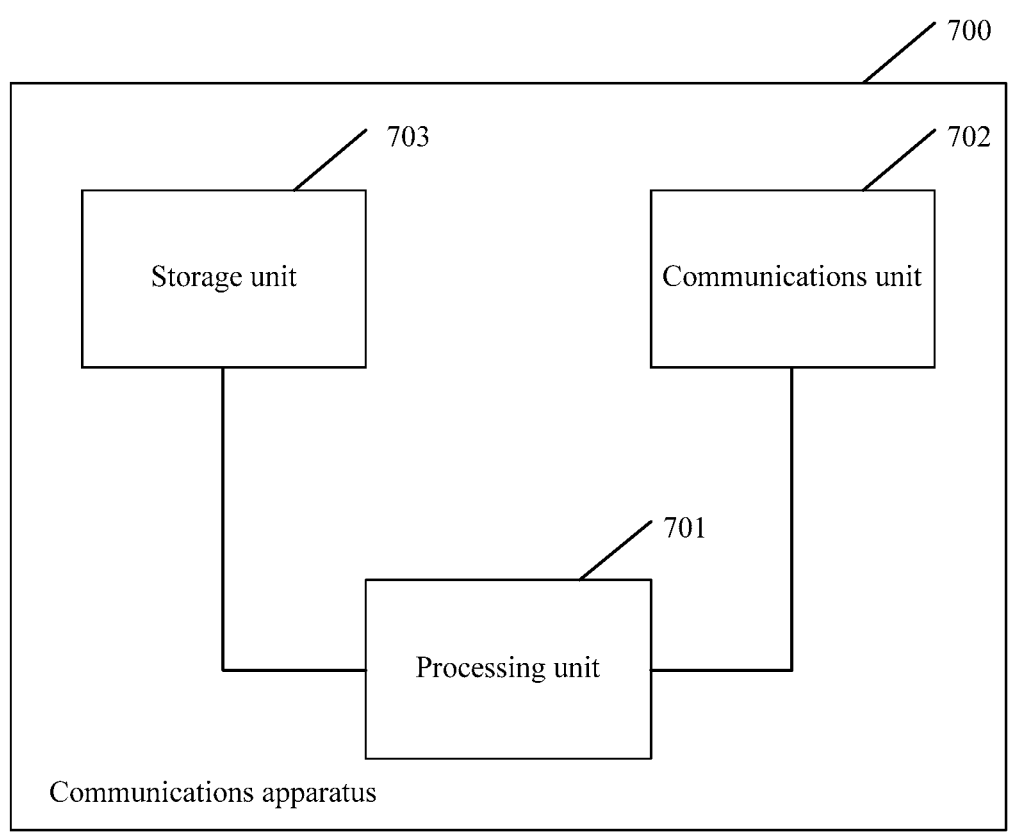
FIG. 7 is a schematic structural diagram of a communications apparatus according to an embodiment of this application.

In a simple embodiment, a person skilled in the art may figure out that, the device 500 for sending a beam refinement protocol packet or the device 600 for receiving a beam refinement protocol packet may be alternatively implemented by using a structure of a communications apparatus 700 shown in FIG. 7.

The communications apparatus 700 may include a processing unit 701 and a communications unit 702. The processing unit 701 may be, for example, a processor. The communications unit 702 may be, for example, a transceiver, and the transceiver may include a radio frequency circuit. The communications apparatus 700 may be a field-programmable gate array (FPGA), an ASIC, a system on chip (SoC), a central processing unit (CPU), a network processor (NP), a digital signal processing circuit (digital signal processor, DSP), a micro controller (micro controller unit, MCU), a programmable controller (programmable logic device, PLD), or another integrated chip. The communications apparatus 700 may be disposed in the first device or the second device in the embodiments of this application, so that the first device can implement the method for sending a beam refinement protocol packet according to the embodiments of this application, or so that the second device can implement the method for receiving a beam refinement protocol packet according to the embodiments of this application. For example, the communications apparatus 700 is a chip disposed in the first device or the second device.

In an optional implementation, the communications apparatus 700 may further include a storage unit 703. Still referring to FIG. 7, the storage unit 703 is connected to the processing unit 701. The storage unit 703 is configured to store a computer program or an instruction, and the processing unit 701 is configured to decode and execute the computer program or the instruction. It should be understood that, the computer program or the instruction may include a function program of the foregoing terminal device. When function programs of the first device are decoded and executed by the processing unit 701, the first device may be enabled to implement a function of the first device in the method for sending a beam refinement protocol packet according to the embodiments of this application. When function programs of the second device are decoded and executed by the processing unit 701, the second device may be enabled to implement a function of the second device in the method for receiving a beam refinement protocol packet according to the embodiments of this application.

In another optional implementation, the function programs of the first device are stored in a storage unit outside the communications apparatus 700. In this case, the storage unit includes, for example, a storage unit located in the first device and outside the communications apparatus 700, for example, a read-only memory (ROM), another type of static storage device that can store static information and an instruction, or a random access memory (RAM). When the function programs of the first device are decoded and executed by the processing unit 701, the storage unit 703 temporarily stores some or all of the function programs of the first device. Alternatively, the function programs of the second device are stored in a memory outside the communications apparatus 700. When the function programs of the second device are decoded and executed by the processing unit 701, the storage unit 703 temporarily stores some or all of the function programs of the first device.

In another optional implementation, the function programs of the first device are set to be stored in the storage unit 703 in the communications apparatus 700. In FIG. 7, an example in which the function programs of the first device are set to be stored in the storage unit 703 in the communications apparatus 700 is used. In this case, the storage unit 703 is, for example, a register or a cache. When the storage unit 703 in the communications apparatus 700 stores the function programs of the first device, the communications apparatus 700 may be disposed in the first device according to the embodiments of this application. Alternatively, the function programs of the second device are set to be stored in the storage unit 703 disposed outside the communications apparatus 700. When the storage unit 703 in the communications apparatus 700 stores the function programs of the second device, the communications apparatus 700 may be disposed in the second device according to the embodiments of this application.

In still another optional implementation, some function programs of the first device are stored in a storage unit outside the communications apparatus 700, and other function programs of the first device are stored in the storage unit 703 in the communications apparatus 700. Alternatively, some function programs of the second device are stored in a storage unit outside the communications apparatus 700, and other function programs of the second device are stored in the storage unit 703 in the communications apparatus 700.

In addition, the device 500 for sending a beam refinement protocol packet according to the embodiment shown in FIG. 5 may be alternatively implemented in another form. For example, the device for sending a beam refinement protocol packet includes a processing unit and a transceiver unit. The processing unit may be configured to perform S21 in the embodiment shown in FIG. 2, and/or configured to support another process of the technology described in this specification. The transceiver unit may be configured to perform S22 in the embodiment shown in FIG. 2, and/or configured to support another process of the technology described in this specification.

For example, the processing unit is configured to determine a transmission format of a beam training TRN subfield based on first information. The first information includes at least one of information indicating a quantity of transmit chains used for transmitting the TRN subfield on each channel, information indicating a type of an antenna used for transmitting the TRN subfield, and information indicating a channel transmission mode; and the channel transmission mode is a channel bonding mode or a channel aggregation mode, and the type of the antenna is a single polarization mode or a dual polarization mode. The transceiver unit is configured to send a beam refinement protocol packet to the second device on a transmit chain based on the transmission format. The beam refinement protocol packet includes a data field and a TRN field, and the TRN field includes a plurality of TRN subfields.

For all related content of the steps in the foregoing method embodiments, refer to function descriptions of corresponding functional modules, and details are not described herein again.

The device 600 for receiving a beam refinement protocol packet according to the embodiment shown in FIG. 6 may be alternatively implemented in another form. For example, the device for receiving a beam refinement protocol packet includes a processing unit and a transceiver unit. The processing unit may be configured to perform S22 in the embodiment shown in FIG. 2, and/or configured to support another process of the technology described in this specification. The transceiver unit may be configured to perform S22 in the embodiment shown in FIG. 2, and/or configured to support another process of the technology described in this specification.

For example, the transceiver unit is configured to receive notification signaling sent by the first device. The processing unit is configured to determine that the notification signaling is used to indicate a transmission format of a beam training TRN subfield in the beam refinement protocol packet sent by the first device. The transmission format is determined based on first information, and the first information includes at least one of information indicating a quantity of transmit chains used for transmitting the TRN subfield on each channel, information indicating a type of an antenna used for transmitting the TRN subfield, and information indicating a channel transmission mode; and the channel transmission mode is a channel bonding mode or a channel aggregation mode, and the type of the antenna is a single polarization mode or a dual polarization mode. The transceiver unit is further configured to receive the beam refinement protocol packet from a transmit chain of the first device based on the transmission format. The beam refinement protocol packet includes a data field and a TRN field, and the TRN field includes a plurality of TRN subfields.

For all related content of the steps in the foregoing method embodiments, refer to function descriptions of corresponding functional modules, and details are not described herein again.

The device 500 for sending a beam refinement protocol packet, the device 600 for receiving a beam refinement protocol packet, and the communications apparatus 700 according to the embodiments of this application may be configured to perform the method according to the embodiment shown in FIG. 2. Therefore, for a technical effect that can be obtained by the device 500, the device 600, and the communications apparatus 700, refer to the foregoing embodiment, and details are not described herein again.

The embodiments of this application are described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of any other programmable data processing device to generate a machine, so that the instructions executed by the computer or the processor of any other programmable data processing device generate an apparatus for implementing a specified function in one or more processes in the flowcharts and/or in one or more blocks in the block diagrams.

All or some of the foregoing embodiments may be implemented by software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of this application are all or partially generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

Obviously, a person skilled in the art can make various modifications and variations to the embodiments of this application without departing from the spirit and scope of this application. This application is intended to cover these modifications and variations provided that they fall within the scope of protection defined by the following claims and their equivalent technologies.

What is claimed is:

1. A method comprising:
   determining, by a first device, a transmission format of a beam training (TRN) subfield based on first information, wherein the first information comprises information indicating a quantity of transmit chains used for transmitting the TRN subfield on each channel and information indicating a channel aggregation mode; and
   sending, by the first device, a beam refinement protocol packet to a second device on a transmit chain based on the transmission format, wherein the beam refinement protocol packet comprises a data field and a TRN field, and wherein the TRN field comprises a plurality of TRN subfields,
   wherein when the quantity of transmit chains used for transmitting the TRN subfield is 4, the transmission format of the TRN subfield comprises sending a first TRN basic sub-sequence on a first transmit chain in a time unit, sending a second TRN basic sub-sequence on a second transmit chain in the time unit, sending a third TRN basic sub-sequence on a third transmit chain in the time unit, and sending a fourth TRN basic sub-sequence on a fourth transmit chain in the time unit.

2. The method according to claim 1, wherein:
   when the quantity of transmit chains used for transmitting the TRN subfield is 2, the transmission format of the TRN subfield comprises sending a first TRN basic sub-sequence on a first transmit chain, and sending a second TRN basic sub-sequence on a second transmit chain.

3. The method according to claim 1, wherein:
   when the quantity of transmit chains used for transmitting the TRN subfield is 6, the transmission format of the TRN subfield comprises separately sending a first TRN basic sub-sequence on a first transmit chain in two time units, separately sending a second TRN basic sub-sequence on a second transmit chain in the two time units, separately sending a third TRN basic sub-sequence on a third transmit chain in the two time units, separately sending a fourth TRN basic sub-sequence on a fourth transmit chain in the two time units, separately sending a fifth TRN basic sub-sequence on a fifth transmit chain in the two time units, and separately sending a sixth TRN basic sub-sequence on a sixth transmit chain in the two time units; and
   a mask used by the first TRN basic sub-sequence is [1, 1], a mask used by the second TRN basic sub-sequence is [1, 1], a mask used by the third TRN basic sub-sequence is [1, 1], a mask used by the fourth TRN basic sub-sequence is [1, 1], a mask used by the fifth TRN basic sub-sequence is [1, 1], and a mask used by the sixth TRN basic sub-sequence is [1, 1].

4. The method according to claim 1, wherein:
   when the quantity of transmit chains used for transmitting the TRN subfield is 8, the transmission format of the TRN subfield comprises separately sending a first TRN basic sub-sequence on a first transmit chain in two time units, separately sending a second TRN basic sub-sequence on a second transmit chain in the two time units, separately sending a third TRN basic sub-sequence on a third transmit chain in the two time units, separately sending a fourth TRN basic sub-sequence on a fourth transmit chain in the two time units, separately sending a fifth TRN basic sub-sequence on a fifth transmit chain in the two time units, separately sending a sixth TRN basic sub-sequence on a sixth transmit chain in the two time units, separately sending a seventh TRN basic sub-sequence on a seventh transmit chain in the two time units, and separately sending an eighth TRN basic sub-sequence on an eighth transmit chain in the two time units; and
   a mask used by the first TRN basic sub-sequence is [1, 1], a mask used by the second TRN basic sub-sequence is [1, 1], a mask used by the third TRN basic sub-sequence is [1, −1], a mask used by the fourth TRN basic sub-sequence is [1, −1], a mask used by the fifth TRN basic sub-sequence is [1, 1], a mask used by the sixth TRN basic sub-sequence is [1, 1], a mask used by the seventh TRN basic sub-sequence is [1, −1], and a mask used by the eighth TRN basic sub-sequence is [1, −1].

5. The method according to claim 1, wherein a length of a Golay sequence composing the TRN subfield is TRN_BL× NCBj/2, wherein TRN_BL is length information of the Golay sequence that is indicated in a header of the beam refinement protocol packet, wherein NCBj is a quantity of consecutive channels used for transmitting the TRN subfield on a $j^{th}$ channel, wherein the TRN subfield is composed of the Golay sequence, and wherein j=1 or 2.

6. A device comprising:
at least one processor;
a memory storing instructions executable by the at least one processor, wherein the instructions, when executed by the at least one processor, instruct the at least one processor to determine a transmission format of a beam training (TRN) subfield based on first information, wherein the first information comprises information indicating a quantity of transmit chains used for transmitting the TRN subfield on each channel and information indicating a channel aggregation mode; and
a transceiver, configured to send a beam refinement protocol packet to a second device on a transmit chain based on the transmission format, wherein the beam refinement protocol packet comprises a data field and a TRN field, and wherein the TRN field comprises a plurality of TRN subfields,
wherein when the quantity of transmit chains used for transmitting the TRN subfield is 4, the transmission format of the TRN subfield comprises sending a first TRN basic sub-sequence on a first transmit chain in a time unit, sending a second TRN basic sub-sequence on a second transmit chain in the time unit, sending a third TRN basic sub-sequence on a third transmit chain in the time unit, and sending a fourth TRN basic sub-sequence on a fourth transmit chain in the time unit.

7. The device according to claim 6, wherein:
when the quantity of transmit chains used for transmitting the TRN subfield is 2, the transmission format of the TRN subfield comprises sending a first TRN basic sub-sequence on a first transmit chain, and sending a second TRN basic sub-sequence on a second transmit chain.

8. The device according to claim 6, wherein:
when the quantity of transmit chains used for transmitting the TRN subfield is 6, the transmission format of the TRN subfield comprises separately sending a first TRN basic sub-sequence on a first transmit chain in two time units, separately sending a second TRN basic sub-sequence on a second transmit chain in the two time units, separately sending a third TRN basic sub-sequence on a third transmit chain in the two time units, separately sending a fourth TRN basic sub-sequence on a fourth transmit chain in the two time units, separately sending a fifth TRN basic sub-sequence on a fifth transmit chain in the two time units, and separately sending a sixth TRN basic sub-sequence on a sixth transmit chain in the two time units; and
a mask used by the first TRN basic sub-sequence is [1, 1], a mask used by the second TRN basic sub-sequence is [1, 1], a mask used by the third TRN basic sub-sequence is [1, −1], a mask used by the fourth TRN basic sub-sequence is [1, −1], a mask used by the fifth TRN basic sub-sequence is [1, 1], and a mask used by the sixth TRN basic sub-sequence is [1, 1].

9. The device according to claim 6, wherein:
when the quantity of transmit chains used for transmitting the TRN subfield is 8, the transmission format of the TRN subfield comprises separately sending a first TRN basic sub-sequence on a first transmit chain in two time units, separately sending a second TRN basic sub-sequence on a second transmit chain in the two time units, separately sending a third TRN basic sub-sequence on a third transmit chain in the two time units, separately sending a fourth TRN basic sub-sequence on a fourth transmit chain in the two time units, separately sending a fifth TRN basic sub-sequence on a fifth transmit chain in the two time units, separately sending a sixth TRN basic sub-sequence on a sixth transmit chain in the two time units, separately sending a seventh TRN basic sub-sequence on a seventh transmit chain in the two time units, and separately sending an eighth TRN basic sub-sequence on an eighth transmit chain in the two time units; and
a mask used by the first TRN basic sub-sequence is [1, 1], a mask used by the second TRN basic sub-sequence is [1, 1], a mask used by the third TRN basic sub-sequence is [1, −1], a mask used by the fourth TRN basic sub-sequence is [1, −1], a mask used by the fifth TRN basic sub-sequence is [1, 1], a mask used by the sixth TRN basic sub-sequence is [1, 1], a mask used by the seventh TRN basic sub-sequence is [1, −1], and a mask used by the eighth TRN basic sub-sequence is [1, −1].

10. The device according to claim 6, wherein a length of a Golay sequence composing the TRN subfield is TRN_BL× NCBj/2, wherein TRN_BL is length information of the Golay sequence that is indicated in a header of the beam refinement protocol packet, wherein NCBj is a quantity of consecutive channels used for transmitting the TRN subfield on a $j^{th}$ channel, wherein the TRN subfield is composed of the Golay sequence, and wherein j=1 or 2.

11. A non-transitory computer-readable storage medium, wherein the computer-readable storage medium is configured to store instructions, and wherein the instructions, when executed by at least one processor of a device, cause the device to perform operations comprising:
determining a transmission format of a beam training (TRN) subfield based on first information, wherein the first information comprises information indicating a quantity of transmit chains used for transmitting the TRN subfield on each channel and information indicating a channel aggregation mode; and
sending a beam refinement protocol packet to a second device on a transmit chain based on the transmission format, wherein the beam refinement protocol packet comprises a data field and a TRN field, and wherein the TRN field comprises a plurality of TRN subfields,
wherein when the quantity of transmit chains used for transmitting the TRN subfield is 4, the transmission format of the TRN subfield comprises sending a first TRN basic sub-sequence on a first transmit chain in a time unit, sending a second TRN basic sub-sequence on a second transmit chain in the time unit, sending a third TRN basic sub-sequence on a third transmit chain in the time unit, and sending a fourth TRN basic sub-sequence on a fourth transmit chain in the time unit.

12. The non-transitory computer-readable storage medium according to claim 11, wherein:
when the quantity of transmit chains used for transmitting the TRN subfield is 2, the transmission format of the TRN subfield comprises sending a first TRN basic sub-sequence on a first transmit chain, and sending a second TRN basic sub-sequence on a second transmit chain.

13. The non-transitory computer-readable storage medium according to claim 11, wherein:
when the quantity of transmit chains used for transmitting the TRN subfield is 6, the transmission format of the TRN subfield comprises separately sending a first TRN basic sub-sequence on a first transmit chain in two time units, separately sending a second TRN basic sub-sequence on a second transmit chain in the two time units, separately sending a third TRN basic sub-sequence on a third transmit chain in the two time units, separately sending a fourth TRN basic sub-sequence on a fourth transmit chain in the two time units, separately sending a fifth TRN basic sub-sequence on a fifth transmit chain in the two time units, and separately sending a sixth TRN basic sub-sequence on a sixth transmit chain in the two time units; and
a mask used by the first TRN basic sub-sequence is [1, 1], a mask used by the second TRN basic sub-sequence is [1, 1], a mask used by the third TRN basic sub-sequence is [1, −1], a mask used by the fourth TRN basic sub-sequence is [1, −1], a mask used by the fifth TRN basic sub-sequence is [1, 1], and a mask used by the sixth TRN basic sub-sequence is [1, 1].

14. The non-transitory computer-readable storage medium according to claim 11, wherein:
when the quantity of transmit chains used for transmitting the TRN subfield is 8, the transmission format of the TRN subfield comprises separately sending a first TRN basic sub-sequence on a first transmit chain in two time units, separately sending a second TRN basic sub-sequence on a second transmit chain in the two time units, separately sending a third TRN basic sub-sequence on a third transmit chain in the two time units, separately sending a fourth TRN basic sub-sequence on a fourth transmit chain in the two time units, separately sending a fifth TRN basic sub-sequence on a fifth transmit chain in the two time units, separately sending a sixth TRN basic sub-sequence on a sixth transmit chain in the two time units, separately sending a seventh TRN basic sub-sequence on a seventh transmit chain in the two time units, and separately sending an eighth TRN basic sub-sequence on an eighth transmit chain in the two time units; and
a mask used by the first TRN basic sub-sequence is [1, 1], a mask used by the second TRN basic sub-sequence is [1, 1], a mask used by the third TRN basic sub-sequence is [1, −1], a mask used by the fourth TRN basic sub-sequence is [1, −1], a mask used by the fifth TRN basic sub-sequence is [1, 1], a mask used by the sixth TRN basic sub-sequence is [1, 1], a mask used by the seventh TRN basic sub-sequence is [1, −1], and a mask used by the eighth TRN basic sub-sequence is [1, −1].

* * * * *